United States Patent
Iizuka et al.

(10) Patent No.: US 6,570,728 B2
(45) Date of Patent: *May 27, 2003

(54) TAPE CASSETTE INCLUDING MEMORY UNIT STORING REPRODUCTION CONTROL INSTRUCTIONS

(75) Inventors: Ken Iizuka, Kanagawa (JP); Naoki Nagano, Tokyo (JP)

(73) Assignee: Sony Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/276,072

(22) Filed: Mar. 25, 1999

(65) Prior Publication Data

US 2003/0043506 A1 Mar. 6, 2003

Related U.S. Application Data

(63) Continuation of application No. 08/174,462, filed on Dec. 28, 1993, now Pat. No. 5,523,850.

(30) Foreign Application Priority Data

Dec. 28, 1992 (JP) .......................................... 04-348142

(51) Int. Cl.[7] .............................................. G11B 15/02
(52) U.S. Cl. ............................. 360/69; 360/71; 360/132
(58) Field of Search ........................... 360/132, 69, 71, 360/72.1, 72.2, 73.01, 73.04, 73.05, 73.11, 73.12, 73.13

(56) References Cited

U.S. PATENT DOCUMENTS 4,338,644 A    7/1982   Sitar ........................ 360/132
4,774,600 A    9/1988   Baumeister ................. 360/15

FOREIGN PATENT DOCUMENTS

| BE | A-886 249    | 3/1981  |
|----|--------------|---------|
| EP | A-0 356 995  | 7/1990  |
| GB | A-2 004 108  | 3/1979  |
| WO | WO-A-89 10615| 11/1989 |
| WO | WO-A-93 08568| 4/1993  |
| WO | WO-A-93 10536| 5/1993  |

OTHER PUBLICATIONS

Patent Abstracts of Japan, vol. 12, No. 396 (P–774), Oct. 21, 1988 of JP–A–63 136379 (Matsushita Electric Ind. Co., Ltd.).

Patent Abstracts of Japan, vol. 12, No. 436 (P–787), Nov. 17, 1988 of JP–A–63 166085 (Sony Corp.) Jul. 9, 1988.

Patent Abstracts of Japan, vol. 13, No. 185 (P–865), May 2, 1989 of JP–A–01 013280 (Canon Inc.), Jan. 18, 1989.

Patent Abstracts of Japan, vol. 15, No. 33 (P–1158), Jan. 25, 1991 of JP–A–02 273387 (Pioneer Electron. Corp.), Nov. 7, 1990.

*Primary Examiner*—Robert S. Tupper
(74) *Attorney, Agent, or Firm*—Frommer Lawrence & Haug LLP; William S. Frommer; Dennis M. Smid

(57) ABSTRACT

A tape cassette includes a tape recording medium for recording audio and/or video signals, and a memory unit storing information related to the tape recording medium including positional information of audio and/or video signals stored thereon. The memory unit also stores reproduction control instructions which serve to control the operation of a tape reproduction device using the positional information stored in the memory unit.

6 Claims, 29 Drawing Sheets

FIG. IA
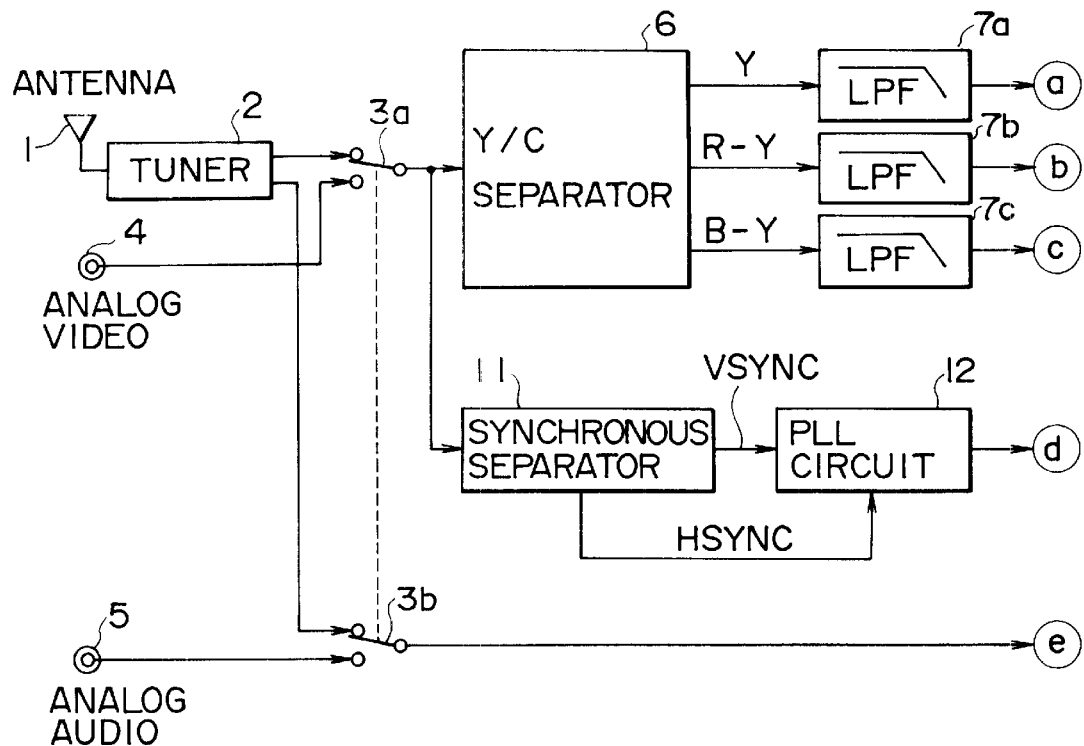
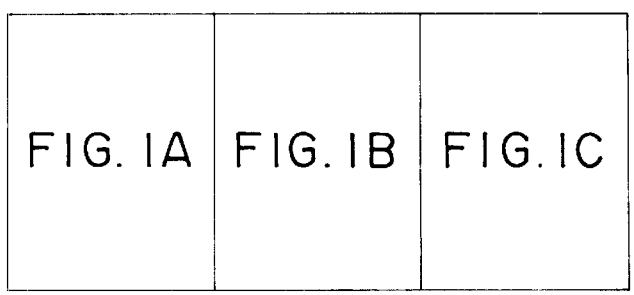
FIG. I

FIG. 1C
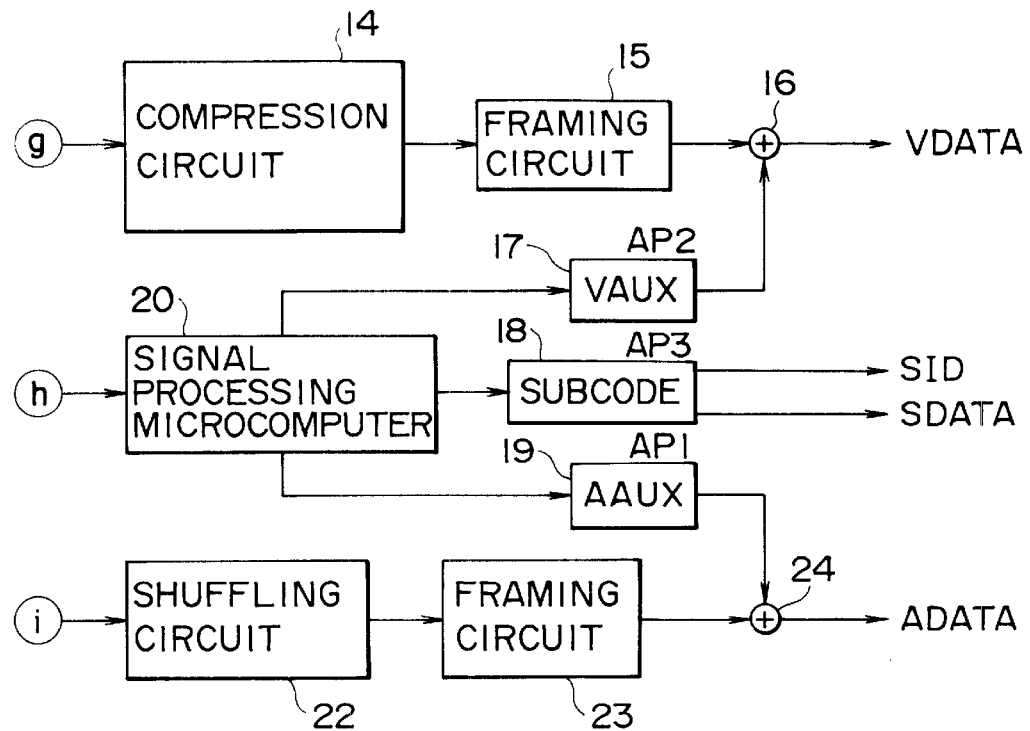
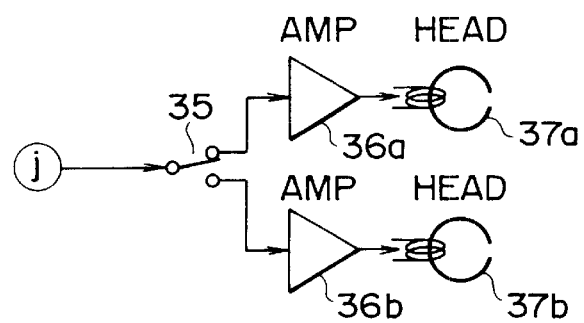
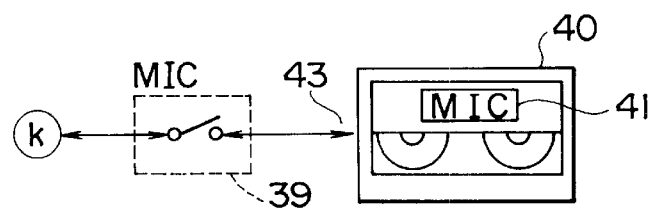

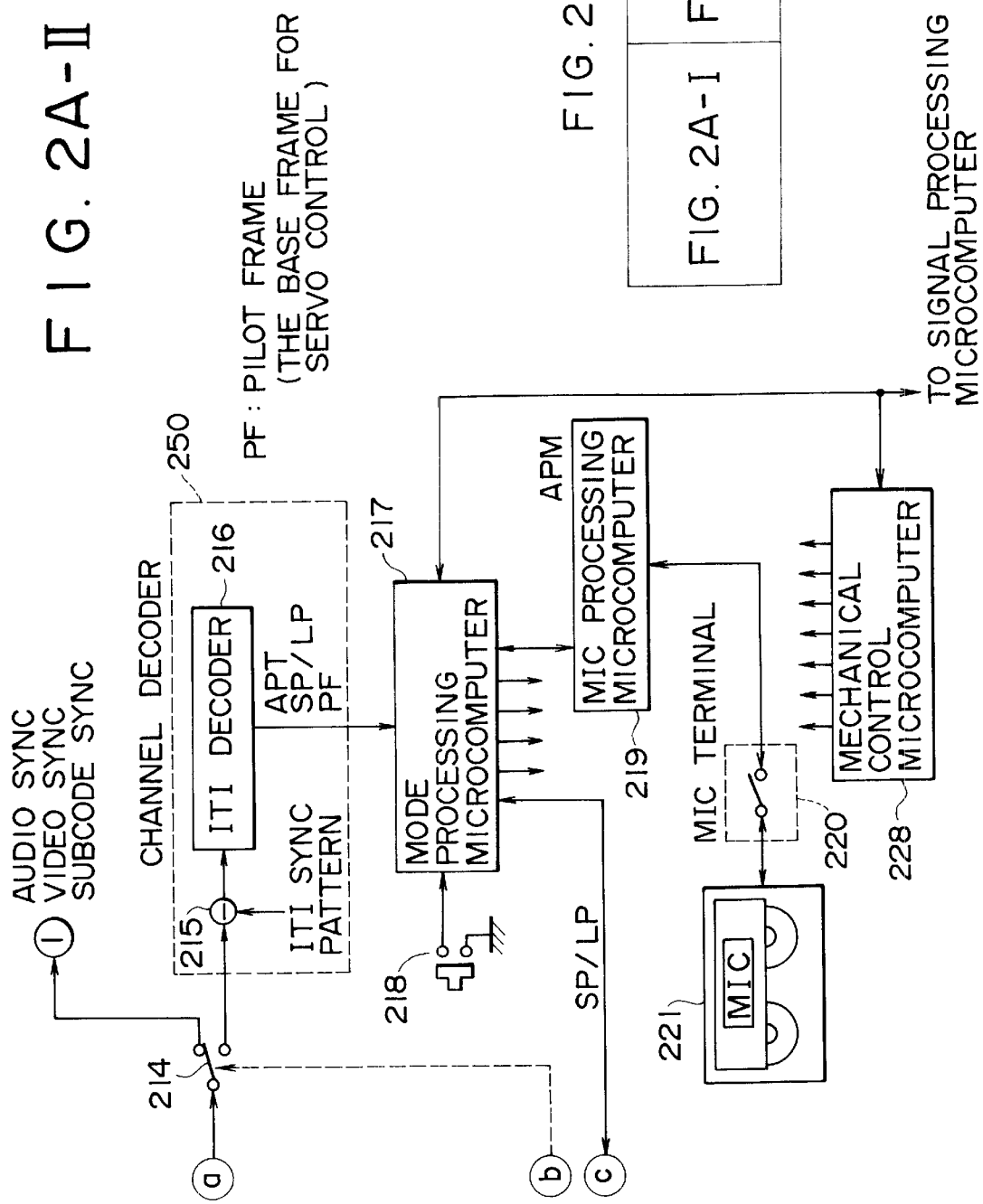

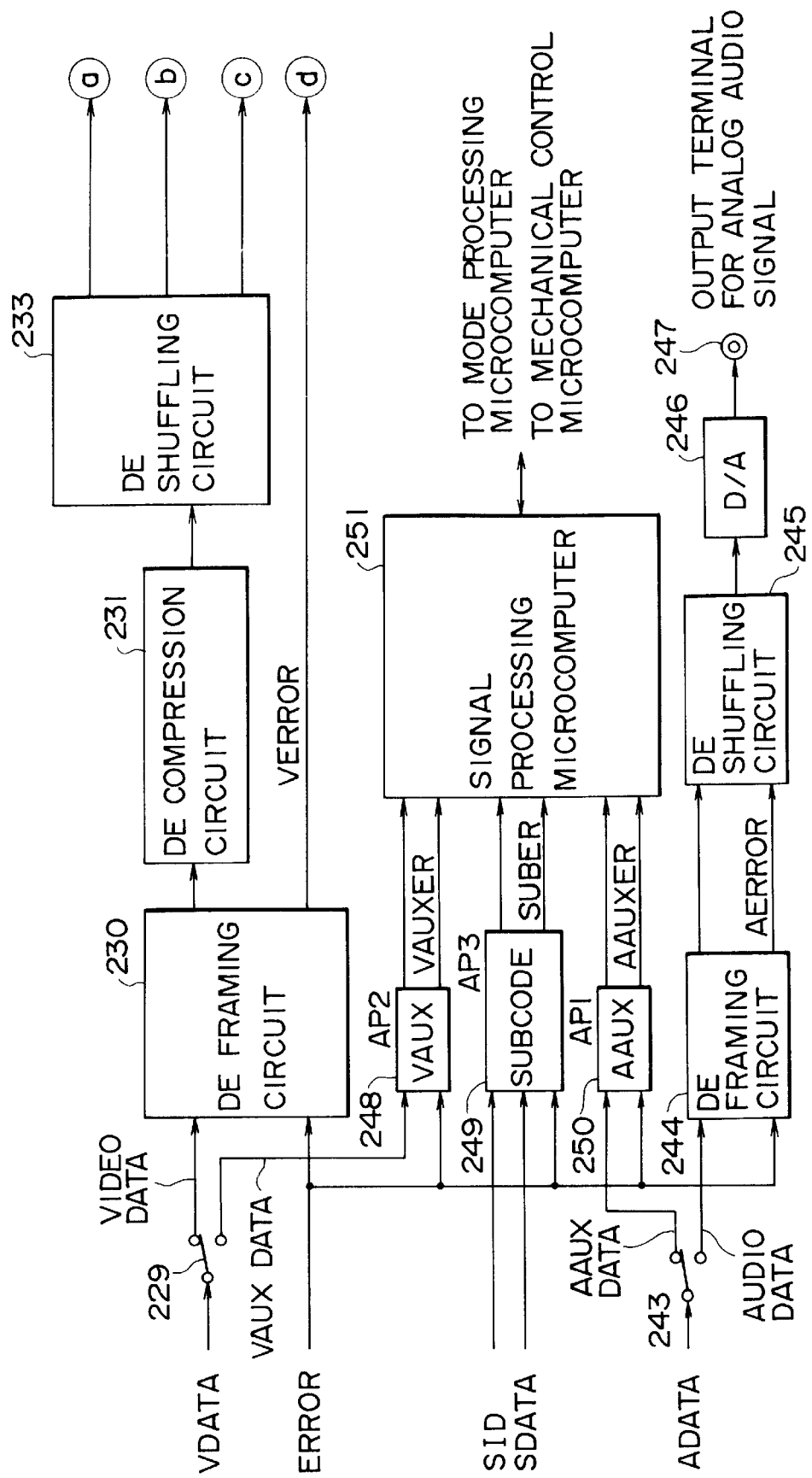
FIG. 2B-I

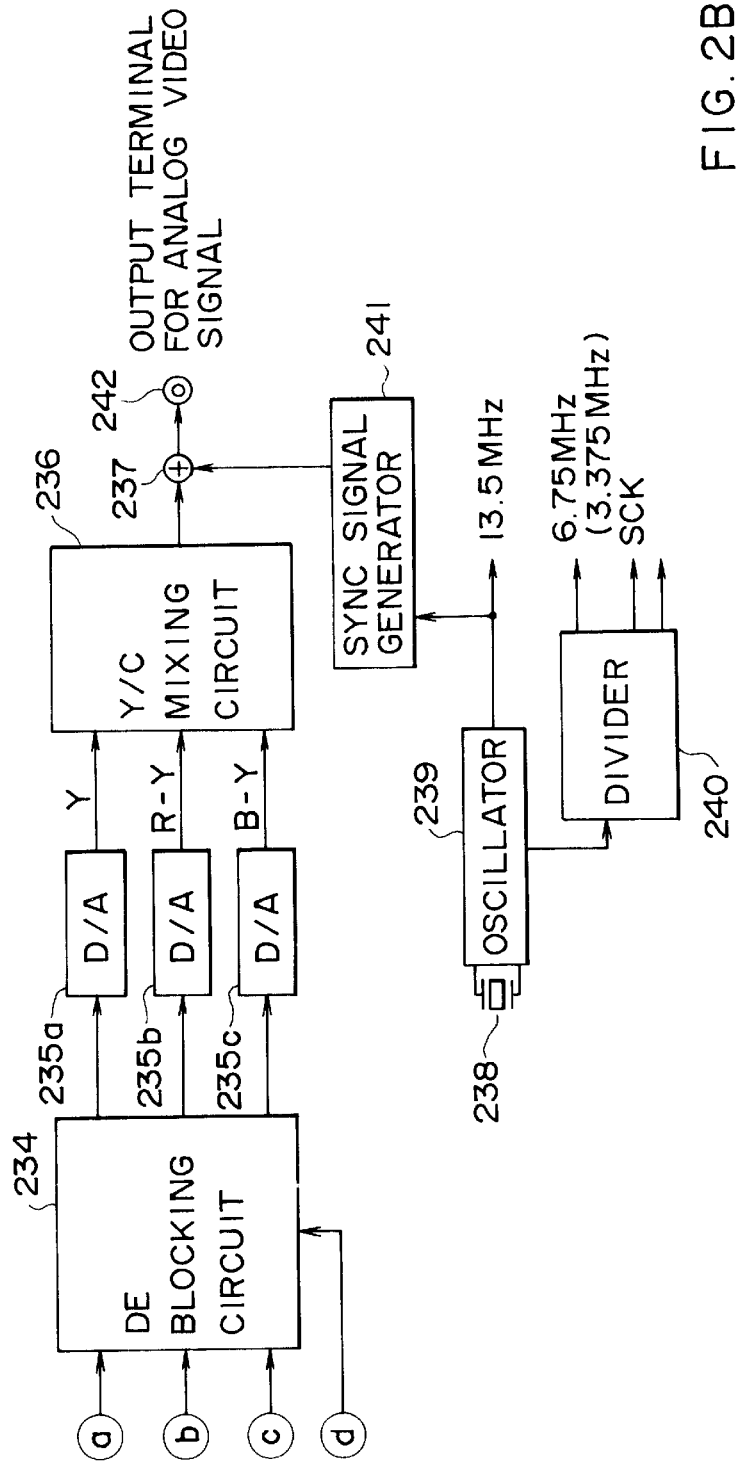

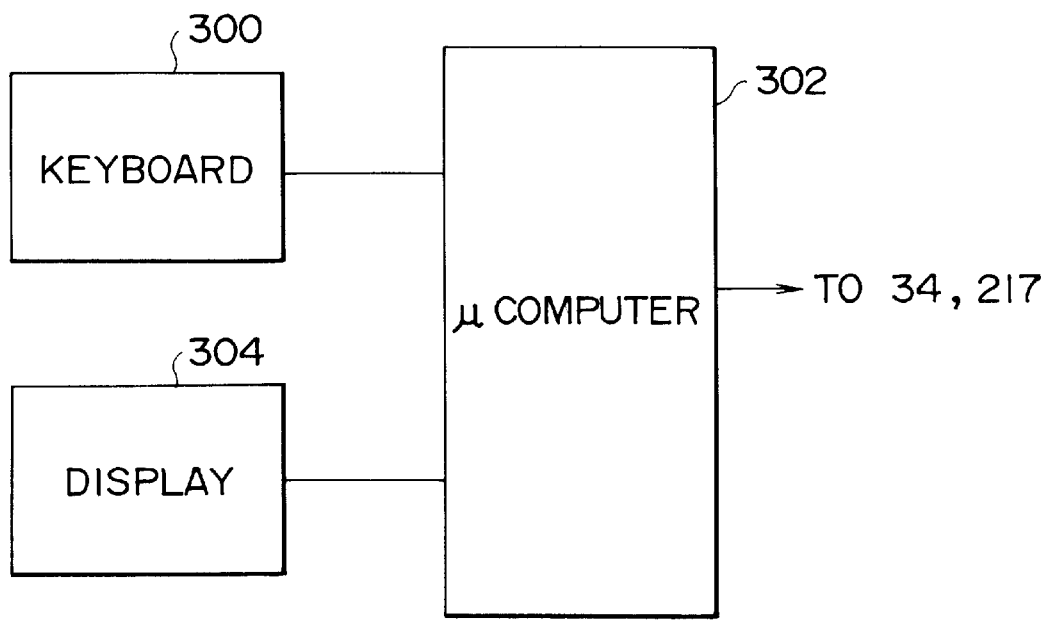

FIG. 5

| UPPER | LOWER | |
|---|---|---|
| 0000 | XXXX | CONTROL |
| 0001 | XXXX | TITLE |
| 0010 | XXXX | CHAPTER |
| 0011 | XXXX | PART |
| 0100 | XXXX | PROGRAM |
| 0101 | XXXX | LINE |
| 0110 | XXXX | VAUX |
| 0111 | XXXX | AAUX |
| 1000 | XXXX | RESERVED |
| 1110 | XXXX | |
| 1111 | aaaa | SOFT MODE |
| 1111 | 1111 | NO INFORMATION | aaaa: 0000-1110
xxxx: 0000-1111

FIG. 6

| ITEM | 0 0 0 0 1 0 1 0 | | |
|---|---|---|---|
| DATA | 0 | DF | FRAMES |
| | SECONDS | | |
| | MINUTES | | |
| | HOURS | | |

FIG. 7

| ITEM | 0 0 0 0 1 0 1 1 | | |
|---|---|---|---|
| DATA | TRACK NO. (BINARY) | | |
| | TAG ID | TAG CONT | |

FIG. 8

| | TAG NAME | TIME CODE |
|---|---|---|
| | ○○○○ | 0 : 12 : 34 |
| ▷ | △△△△ | 0 : 34 : 56 |
| | □□□□ | 1 : 04 : 29 |
| | ⋮ | ⋮ |

FIG. 12A

TAG PACK STRUCTURE

| | MSB | | | | | | | LSB |
|---|---|---|---|---|---|---|---|---|
| PC0 | 0 | 0 | 0 | 0 | 1 | 0 | 1 | 1 |
| PC1 | | | | | | | | 1 |
| PC2 | ---- ABSOLUTE TRACK NO. ---- | | | | | | | |
| PC3 | ←------- (BINARY) ------- | | | | | | | |
| PC4 | TEXT 1 1 1 | | | | TAG ID | | | |

FIG. 12B

| TAG ID | |
|---|---|
| 0000 | INDEX |
| 0001 | SKIP START |
| 0010 | PP (PICTURE PHOTO) |
| 0011 | PROGRAM PLAY START |
| 0100 | ZONE PLAY |
| 0101 | STILL (FIXED TIME) |
| 0110 | FREEZE (FIXED TIME) |
| 0111 | LAST REC POINT |
| 1000 – 1111 | RESERVED |

FIG. 13A

ZONE END PACK STRUCTURE

| PC0 | 0 0 0 0 1 1 1 1 |
|---|---|
| PC1 | ←——————————————→ 1 |
| PC2 | ——— ABSOLUTE TRACK NO. ——— |
| PC3 | ←——————— (BINARY) ——————— |
| PC4 | TAG CONT |

FIG. 13B

TAG CONTROL BYTE

| 0  1 | | |
|---|---|---|
| 1  0 | FMODE | RMODE |
| 1  1 | | |

FIG. 13C

| FMODE | |
|---|---|
| 0 0 0 | NO OPERATION |
| 0 0 1 | PLAY |
| 0 1 0 | SLOW |
| 0 1 1 | CLUE |
| 1 0 0 | FF |
| 1 0 1 | STROBE |
| 1 1 0 - 1 1 1 | RESERVED |

FIG. 13D

| RMODE | |
|---|---|
| 000 | NO OPERATION |
| 001 | REVERSE PLAY |
| 010 | REVERSE SLOW |
| 011 | REVIEW |
| 100 | REWIND |
| 101 | REVERSE STROBE |
| 110-111 | RESERVED |

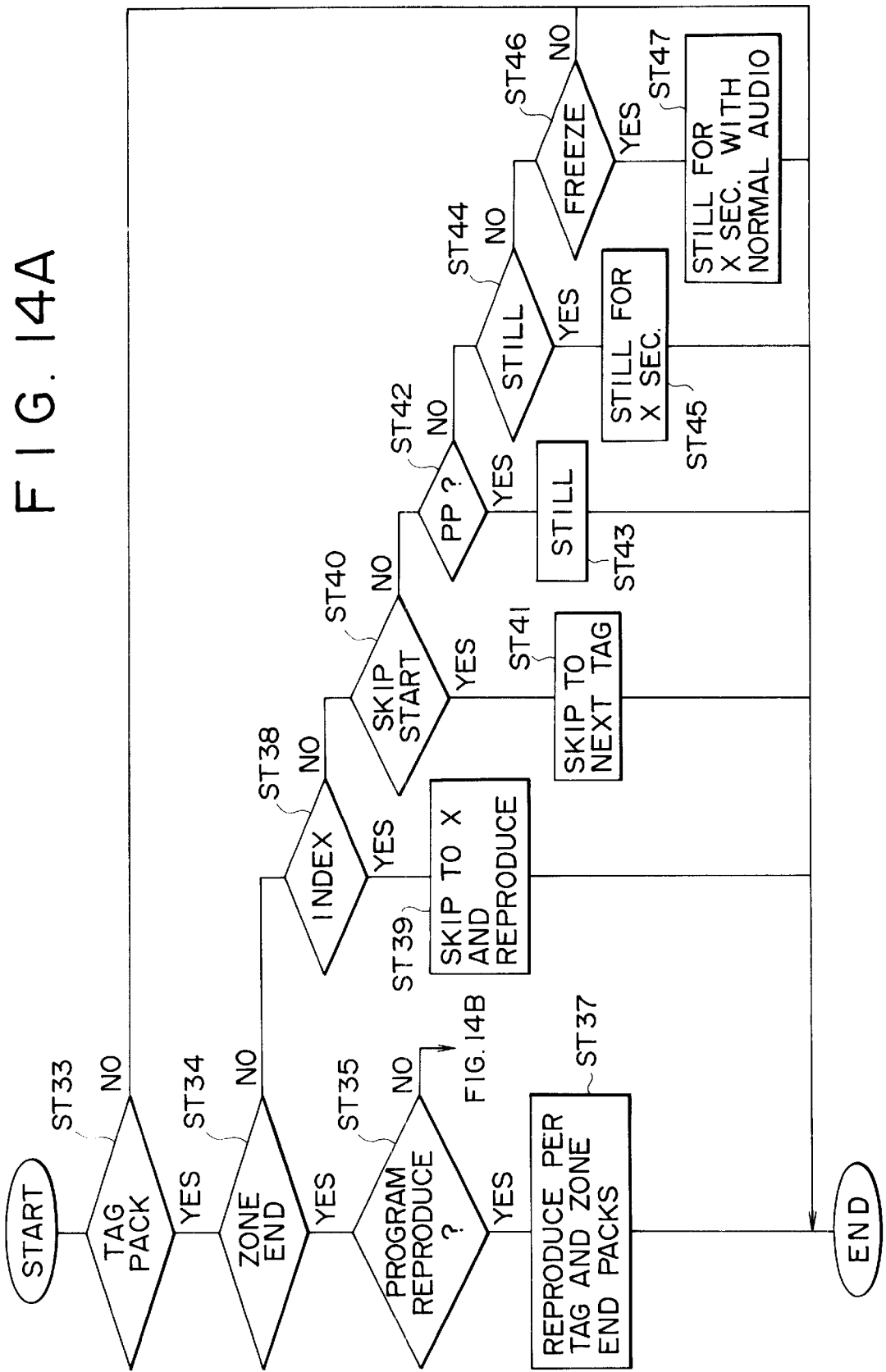

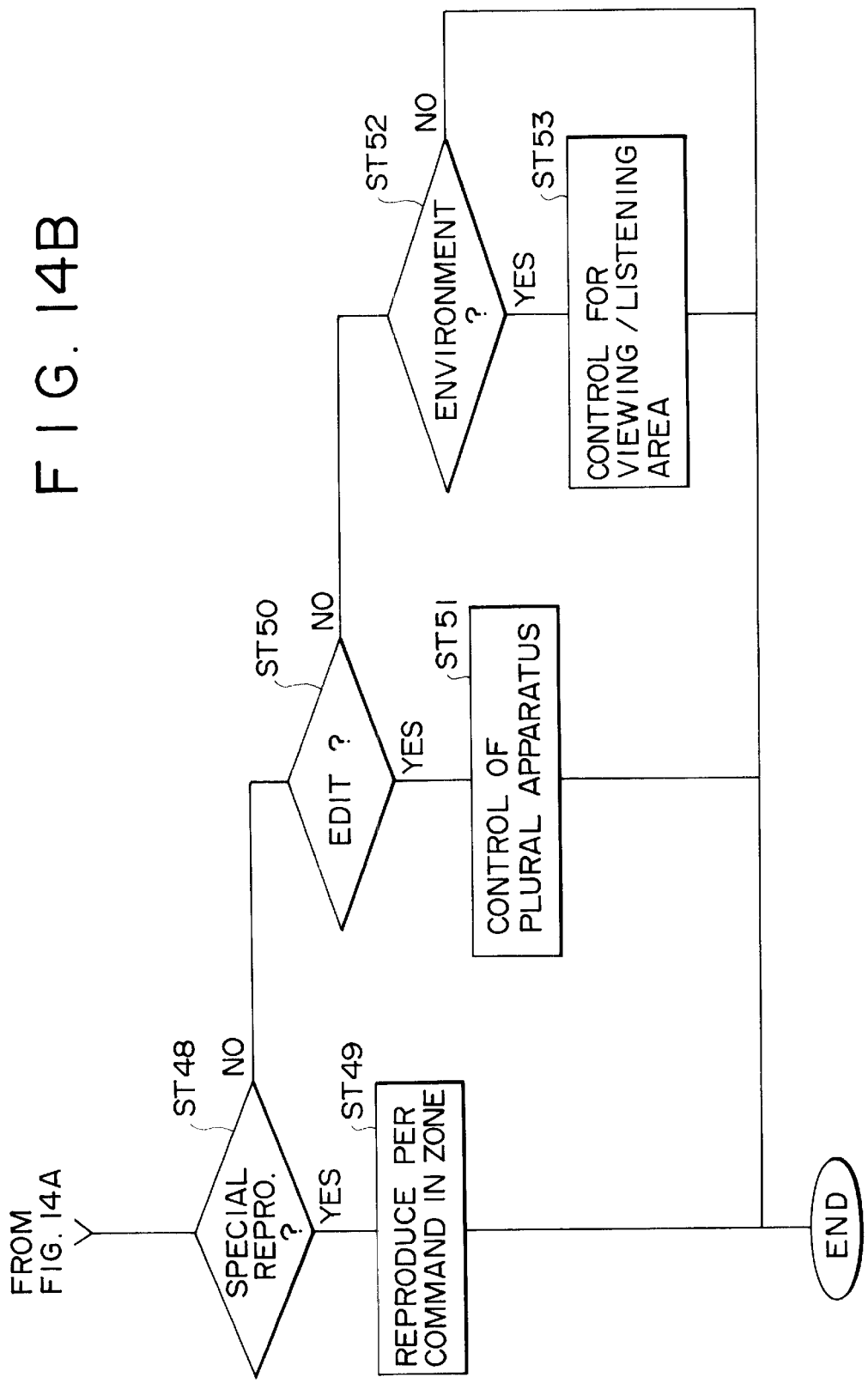

| MAIN AREA | |
|---|---|
| PROGRAM EVENT | |
| TAG (B) | TAG ID = PROGRAM PLAY START (0011) |
| ZONE END (C) | TAG CONT = 01001000 |
| ZONE END (A) | TAG CONT = 01000100 |
| ZONE END (B) | TAG CONT = 01001000 |
| ZONE END (C) | TAG CONT = 01100000 |
| ZONE END (D) | TAG CONT = 01001000 |

FIG. 21A

| TAPE | PROGRAM 1 | PROGRAM 2 | PROGRAM 3 | PROGRAM 4 |

▲A  ▲B  ▲C  ▲D  ▲E

PLAY → SLOW → FF → PLAY

FIG. 21B

| MAIN AREA |
|---|
| PROGRAM EVENT |
| TAG (A) |
| ZONE END (B) |
| ZONE END (C) |
| ZONE END (D) |
| ZONE END (E) |

TAG ID = PROGRAM PLAY START (0011)

TAG CONT = 0100100

TAG CONT = 0101000

TAG CONT = 0110000

TAG CONT = 0100100

| MAIN AREA |
|---|
| PROGRAM EVENT |
| TAG (A) |
| ZONE END (B) |
| ZONE END (C) |
| ZONE END (D) |
| |

TAG ID = PROGRAM PLAY START (0011)

TAG CONT = 0100100

TAG CONT = 1001 0100

TAG CONT = 0100100

INDICATE RECORDED PROGRAM HAS BEEN REPRODUCED PREVIOUSLY

TAPE

▲ A
TAG ID = ZONE START

▲ B
TAG CONT : 0010XXXX

TAPE CASSETTE INCLUDING MEMORY UNIT STORING REPRODUCTION CONTROL INSTRUCTIONS

This is a continuation of application Ser. No. 08/174,462, filed Dec. 28, 1993 now U.S. Pat. No. 5,523,850.

BACKGROUND OF THE INVENTION

The present invention relates to tape cassettes including memory units storing reproduction control instructions for audio and/or video signals recorded on a tape of the cassette.

U.S. Pat. No. 4,338,644 relates to a magnetic tape cassette containing a memory circuit which is used to store information such as instantaneous tape position as well as data indicating other positions on the tape. The position information is read from the memory circuit for use in carrying out functions such as play, fast forward, fast rewind, and recording.

However, the user must input instructions for the particular functions to be carried out, for example, by actuating a key. The usefulness of this device, therefore, is limited.

A further shortcoming of this device is apparent when it is used to carry out editing operations, such as dubbing. In such operations, it is necessary with the use of this conventional device for the user to operate more than one apparatus to perform the editing operation, which is inconvenient.

OBJECTS AND SUMMARY OF THE INVENTION

It is an object of the present invention to provide a tape cassette having a memory unit which overcomes the foregoing disadvantages and shortcomings of the prior art.

It is another object of the present invention to provide such a tape cassette apparatus having a memory unit storing reproduction control instructions which enable programmed reproduction to be carried out.

It is a further object of the present invention to provide a tape cassette having a memory unit storing reproduction control information in a form which facilitates efficient usage of memory space.

In accordance with a first aspect of the present invention, a tape cassette comprises: a tape recording medium for recording audio and/or video signals; and a memory unit storing information related to the tape recording medium including positional information of audio and/or video signals stored thereon; the memory unit also storing reproduction control instructions which serve to control the operation of a tape reproduction device using the positional information stored in the memory unit.

The tape cassette of the present invention enables the use of reproduction control instructions which are based on positional information of audio and/or video signals recorded on a tape of the cassette, thus to provide the ability to implement a variety of control operations based on the positional information without adding to or modifying the audio and/or video signals. In certain embodiments, the stored reproduction control instructions serve to output an image selected from among the signals recorded on the tape to create a print of the image. In other embodiments, skip reproduction instructions are stored as the reproduction control instructions for selectively extracting audio and/or video signals from among those recorded on the tape.

In further embodiments, the instructions include reproduction speed instructions for reproducing selected audio and/or video signals at a controllable speed, such as a selected low or high speed. In still further embodiments, the stored instructions include voice and/or picture quality control signals which serve to control characteristics of audio and/or video signals selected from among those recorded on the tape for controllably varying a characteristic thereof.

Still other instructions may be stored in the memory unit such as instructions for displaying printing information regarding an image to be printed to permit selection of a desired image from among the signals recorded on the tape.

In still further embodiments, the stored instructions include repetitive reproduction instructions for repeatedly reproducing an audio and/or video signal selected on the basis of the positional information; reproduction priority instructions for determining a sequence in which signals selected on the basis of the positional information are to be reproduced; editing control instructions for controlling operations of a further recording and/or reproducing operation of an apparatus other than that which the cassette is load; and viewing/listening environment control instructions for controlling factors such as illumination of the listening/viewing area as reproduction proceeds.

An advantageous pack structure for the reproduction control instructions provides efficient memory usage, along with programming versatility.

The above, and other objects, features and advantageous of the invention, will be apparent in the following detailed description of certain illustrative embodiments thereof which is to read in connection with the accompanying drawings forming a part hereof, and wherein corresponding parts and components are identified by the same reference numerals in the several views of the drawings.

BRIEF DESCRIPTION OF THE DRAWINGS

FIGS. 2A and 2B are block diagrams of a reproducing section of the recording/reproducing apparatus;

FIG. 3 is a block diagram of an input and display subsystem of the recording/reproducing apparats;

FIGS. 4 and 5 are charts for illustrating a pack structure and major item designations therefor, respectively;

FIGS. 6 and 7 are charts illustrating pack structures in accordance with a first embodiment of the present invention;

FIG. 8 is a schematic diagram illustrating a screen display of stored tag packs;

FIGS. 12A and 12B are charts for use in describing a tag pack structure in accordance with an embodiment of the present invention;

FIGS. 13A through 13D are charts for use in describing a zone end pack structure in accordance with an embodiment of the present invention;

FIGS. 14A and 14B are flow charts for use in illustrating operations which may be controlled using the tag pack and zone end pack embodiments of FIGS. 12A, 12B, 13A and 13B; and FIGS. 15A and 15B through FIGS. 25A and 25B are diagrams for use in illustrating the operations described in connection with FIGS. 14A and 14B.

DETAILED DESCRIPTION OF CERTAIN ADVANTAGEOUS EMBODIMENT

A recording/reproducing apparatus which is useful for recording and reproducing a tape cassette in accordance with an embodiment of the present invention will now be described in connection with FIGS. 1, 2A, 2B and 3.

Figure 1B:
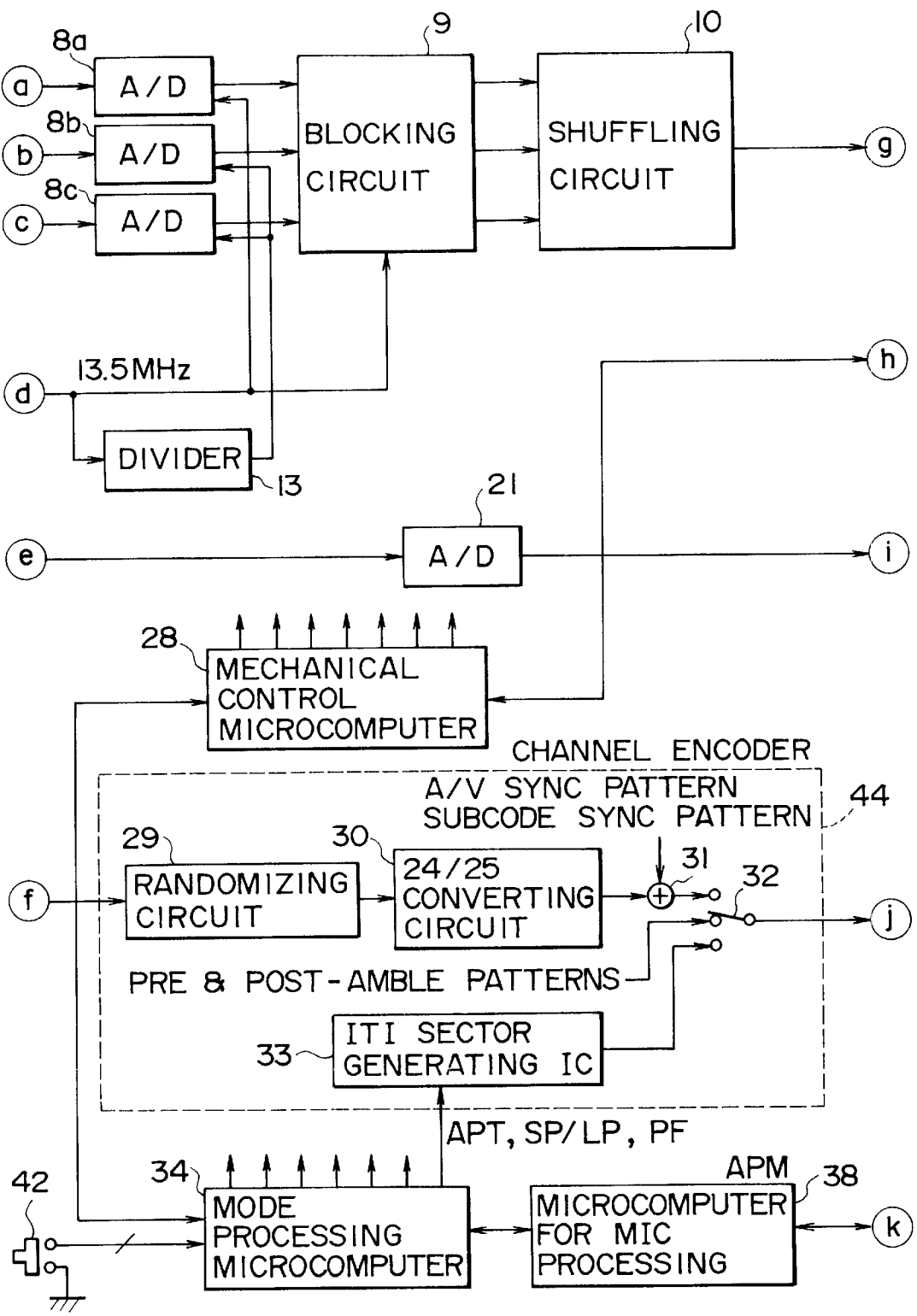
FIG. 1 is a block diagram of a recording section of a recording/reproducing apparatus for use with the present invention.
Figures 1, 2A:
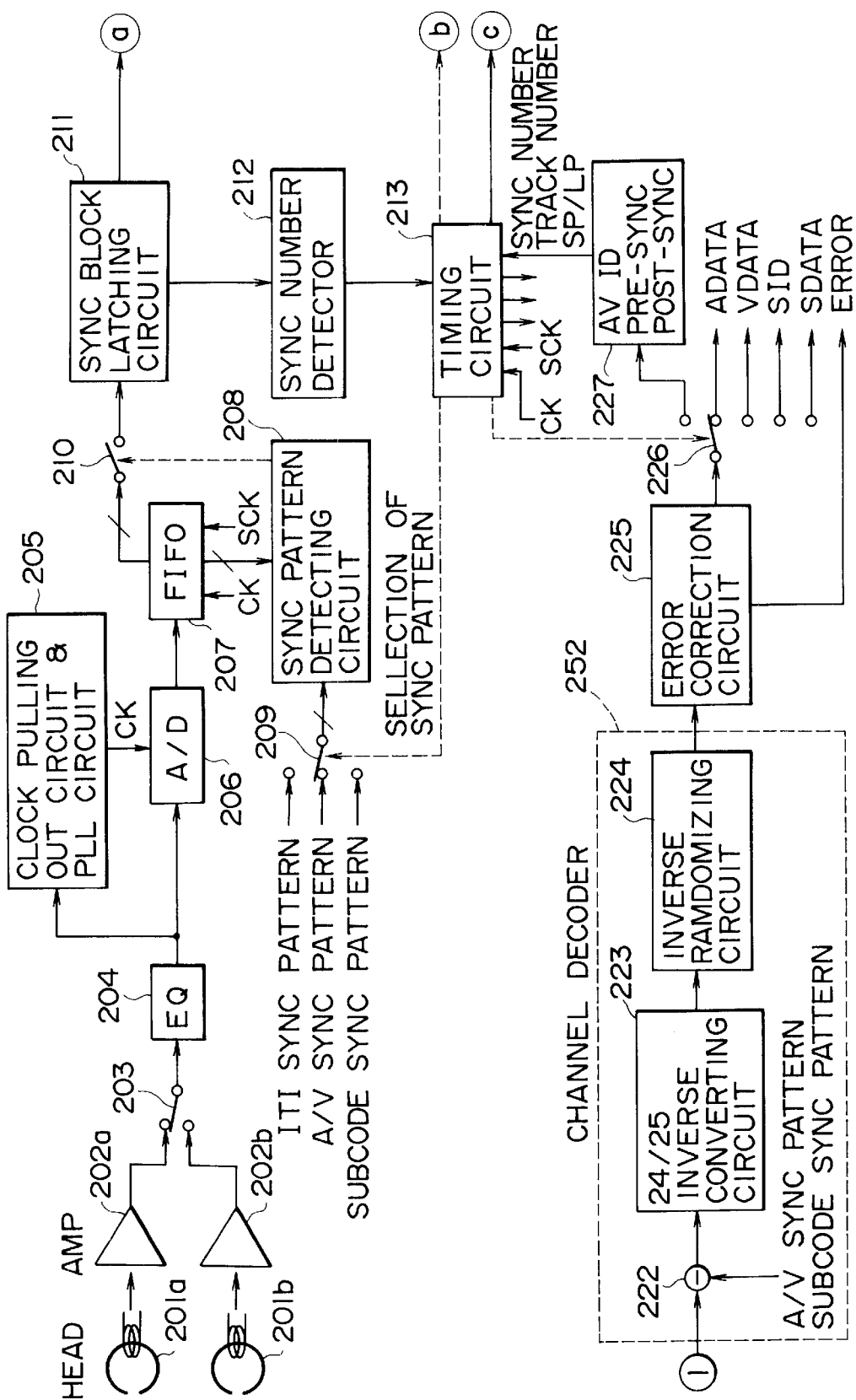

FIG. 1 is a block diagram of a recording section of the recording/reproducing apparatus. A tape cassette 40 in accordance with an embodiment of the present invention includes a magnetic tape wound about a pair of spindles thereof to be driven by a tape deck of the recording/reproducing apparatus (not shown for purposes of simplicity and clarity) for recording and/or reproducing audio and/or video signals on the magnetic tape. The magnetic tape cassette 40 also includes a memory unit MIC (Memory In Cassette) 41 which serves to store information related to the magnetic tape including positional information of audio and/or video signals stored thereon. The MIC 41 also stores reproduction control instructions which serve to control the operation of the recording/reproduction apparatus using the positional information stored in the memory unit, as described in greater detail hereinbelow.

The recording apparatus includes a communication terminal 43 and a communication controller (microcomputer for MIC processing 38) for writing the tape information and positional information in the MIC 41 based on the audio/video signals recorded on the tape.

A television signal received by antenna 1 is selected by a tuner 2 and restored thereby to a composite video signal and a composite audio signal. Alternatively, a composite video signal is selected by a switch 3a from an external input 4. The selected composite video signal is applied to a Y/C separator 6 where it is divided into a luminance signal (Y) and color difference signals (R-Y, B-Y).

The composite video signal is also applied to a sync separator 11 from which a vertical synchronizing signal (VSYNC) and a horizontal synchronizing signal (HSYNC) are derived. These signals serve as reference signals for a PLL (Phase Locked Loop) circuit to generate a basic sampling signal of 13.5 MHz locked with the input signal. Since this frequency is not normally needed for sampling a color signal, the 13.5 MHz frequency is divided by a factor of 2 or 4 by divider 13 and the resultant frequency is used for sampling the color difference signals. Sampling is performed at a ratio of 4:1:1 for the NTSC format and 4:2:0 for the PAL format.

The analog outputs from the Y/C separator 6 are band limited by low-pass filters (LPFs) 7a, 7b and 7c to avoid aliasing. The cutoff frequencies of these filters are, for example, 5.75 MHz for Y filter 7a; and 2.75 MHz for R-Y filter 7b and B-Y filter 7c. The filtered signals are then converted into digital signals by A/D converters 8a, 8b and 8c, and divided into code blocks of 8 samples by 8 lines each by a blocking circuit 9 and transformed thereby to frequency domain data by discrete cosine transformation. The resultant code is shuffled by a shuffling circuit 10 to prevent data loss due to a clogged tape head or by a transverse scratch on the tape. Shuffling circuit 10 also rearranges the luminance data signal and the color difference data to avoid loss of data concentrated spatially or temporally as a result of head clogging or a transverse scratch on the tape.

A data compression encoder 14 compresses the video data by variable length coding and requantization. The compressed video data is then packed by a framing circuit 15 into predetermined sync blocks. Video auxiliary data (VAUX), audio auxiliary data (AAUX), and subcode data for storage, respectively, in video, audio and subcode track areas, and a track number to be stored in the subcode area are generated by a signal processing microcomputer 20 and are fed to interface units 17, 18, 19, respectively. The interface unit 17 for a VAUX sector of the video area generates an AP2 (application ID data), which is combined with the framing output by a combining circuit 16. The interface unit 18 for the subcode area generates data SID (sync words and ID data including absolute track address) and AP3 (for defining the data structure) and also generates pack data SDATA (for example, including information pertinent to a recorded program, such as title, chapter, and part information).

An audio signal is selected by switch 3b either from the output of tuner 2 or from an external analog audio input signal. The selected audio signal is converted by A/D converter 21 into a digital signal. The digital signal is then shuffled by shuffling circuit 22 and packed by framing circuit 23 into audio sync blocks. AAUX interface unit 19 supplies the AP1 data and the AAUX data packs to combining circuit 24 for combining with the audio sync block data.

A data generator 25 generates AV (audio/video) ID signals, a pre-sync signal and a post-sync signal, one of which, together with the ADATA, VDATA, SID and SDATA, is selected by a time-division multiplexer 26 and added to parity data produced by an error correction code generator 27. The resultant signal is sent to a channel encoder 44. In the channel encoder 44, randomizing circuit 29 randomizes the signal supplied thereto to minimize its DC component. The resultant signal is coded by a 24/25 converting circuit 30 to provide a digital automatic track finding signal for servo control. Circuit 30 preferably is a Partial Response Class IV Circuit suitable for digital processing. The signal thus obtained is combined with an audio/video sync pattern and a subcode sync pattern by combining circuit 31. An ITI sector generator 33 is fed with APT (Application) ID data, SP/LP (standard play/long play) data, and PF (pilot frequency) data from a mode processing microcomputer 34. The ITI sector generator 33 packs this data into predetermined positions and applies the resultant data to switch 32 which selects between this resultant data, pre- and post-amble data and the output of combining circuit 31 in a timed pattern. A switch 42 is used to select an LP or an SP recording mode and the setting of switch 42 is sent to microcomputers 34 and 38.

A final recording signal obtained from channel encoder 44 is selected by a switch 35 for supply alternately to diametrically opposed heads 37a and 37b after amplification by head amplifiers 36a and 36b for recording on tape 40.

Microcomputer for MIC processing 38 then generates pack data and APT data (for indicating data format) which is written in MIC 41 in the cassette 40 via an MIC switch 39.

FIGS. 2A and 2B together provide a block diagram of a reproducing apparatus for reproducing data recorded by means of the recording apparatus of FIG. 1. Coded data in the format described above is read from a magnetic tape by heads 201a and 201b, the output of each of which is amplified by a respective amplifier 202a and 202b. Data from that one of the heads in contact with the tape at any given time is selected by a switch 203 and applied to an equalizing circuit 204. From the equalizing circuit, the data is provided both to the input of an analog-to-digital converter (A/D) 206 as well as to a clock extracting and phase locked loop (PLL) circuit 205 which serves to produce a clock signal from the reproduced data synchronized therewith for use in sampling the reproduced data by means of the A/D 206.

The digitized data is output by the A/D 206 to a time base corrector circuit including a first-in-first-out memory (FIFO) 207 which writes the data in accordance with the clock signal CK produced by the circuit 205 and outputs the data therefrom by means of a stable clock signal (SCK) produced by dividing the output of an oscillator 239 stabilized by a crystal 238 by means of a dividing circuit 240 (refer to FIG. 2B).

A timing circuit 213 provided with the clock signal CK and the stable clock signal SCK outputs a signal to a selection switch 209 for selecting an appropriate one of an ITI sync pattern, an A/V sync pattern and a subcode sync pattern for provision to a sync pattern detecting circuit 208. The sync pattern detecting circuit is supplied with a parallel output from the FIFO 207 for detecting an appropriate sync pattern therein for closing a switch 210 in order to supply each successively reproduced sync block to a sync block latching circuit 211. The sync block latching circuit 211 outputs a signal to a sync number detector 212 for detecting a sync number for use by the timing circuit 213. The timing circuit 213 also controls the state of a selector switch 214 for appropriately supplying a reproduced ITI sync pattern to a first channel decoder 250 which serves to decode the reproduced ITI data, or to a second channel decoder 252 which serves to decode audio data (ADATA), video data (VDATA), SID and subcode data (SDATA).

The first channel decoder 250 includes a subtracting circuit 215 supplied at a first input with the reproduced ITI data and at a second input with the ITI sync pattern. The output of the subtracting circuit 215 is supplied to an ITI decoder which separates the APT data, the SP/LP data and the PF or pilot frame data. The pilot frame data is employed for effecting servo control based upon the reproduced signal. This data is supplied to a mode processing microcomputer 217 for effecting servo control by means of a mechanical control microcomputer 228, as well as for other purposes.

The reproduced audio, video and subcode data is supplied to the second channel decoder 252 and to a first input of a subtracting circuit 222 thereof which receives the A/V sync pattern or the subcode sync pattern, as appropriate, at a second input, and outputs the remaining data to a 24/25 inverse converting circuit 223 which serves to reconvert the data to its form as input to the circuit 30 of the channel encoder 43 of FIG. 1. The output of the circuit 223 is supplied to an inverse randomizing circuit 224 which serves to restore the data to its form as input to the randomizing circuit 29 of FIG. 1.

The output of the inverse randomizing circuit 224 is supplied to an error correction circuit 225 which outputs error corrected data to a demultiplexer 226, or else outputs an error signal indicating data which cannot be error corrected. From the demultiplexer 226 A/V ID data as well as pre-sync and post-sync are received by a circuit 227 for use by the timing circuit 213. The demultiplexer 226 also provides the audio data, video data, SID and subcode data at separate outputs which are processed further as described hereinbelow.

The apparatus as illustrated in FIG. 2A also includes a SP/LP selector switch 218 coupled with the mode processing computer 217. The mode processing microcomputer 217 also communicates with an MIC processing microcomputer 219 which reads information from and stores information in an MIC of a tape cassette 221 through an MIC terminal 220.

With reference also to FIG. 2B, the video data VDATA is supplied to a demultiplexer 229 which separates the video data therefrom for supply to a deframing circuit 230, as well as the VAUX data therefrom which is supplied to a VAUX circuit 248 for disassembling the various items thereof. The video data after deframing by the circuit 230 is subject to decompression by a decompression circuit 231 which carries out operations which are the inverse of those carried out by the compression circuit 14 of FIG. 1. The output of the decompression circuit 231 is deshuffled by a deshuffling circuit 233 and deblocked by a deblocking circuit 234 to separate digital Y, (R-Y) and (B-Y) data. The Y, (R-Y) and (B-Y) data are converted to analog form by a respective digital-to-analog converters 235a, 235b, and 235c and thereafter mixed by a Y/C mixing circuit 236 and combined with horizontal and vertical synchronizing signals generated by a sync signal generator 241 under control of the oscillator 239 to output a composite analog video signal at an output terminal 242.

The audio data ADATA is demultiplexed by a demultiplexer 243 to separate audio data therefrom which is supplied to a deframing circuit 244 as well as AAUX data therefrom which is supplied to an AAUX circuit 250 which serves to separate the various data items therein. The output of the deframing circuit 244 is supplied to a deshuffling circuit 245 which then outputs a deshuffled data stream which is then reconverted to analog form by a digital-to-analog converter 246. The analog data supplied thereby is output at a terminal 247.

The SID and subcode data (SDATA) are supplied to a subcode data separation circuit 249. The separated data items supplied by the circuits 248, 249 and 250 are supplied thereby to a signal processing microcomputer 251 for use in generating appropriate control signals for application to the mode processing microcomputer 217 and the mechanical control microcomputer 228 of FIG. 2A.

Referring also to FIG. 3, a keyboard 300 enables user input to a microcomputer 302 of the recording/reproducing apparatus. The microcomputer 302 also provides a display to the user by means of a display device 304. The microcomputer 302 communicates with the mode processing microcomputers 34 and 217. It will be appreciated that the input and display functions of microcomputer 302 may instead be carried out by one or more of the further microcomputers of FIGS. 1, 2A and 2B.

With reference now to FIG. 4, a pack data structure is illustrated therein, which corresponds with a recording format described in Japanese Patent Application No. 4-325618, commonly assigned with the present application. The pack data structure of FIG. 4 is employed according to an advantageous embodiment of the present invention for storing data in a memory unit of a tape cassette. Data having the format of FIG. 4 may also be recorded on magnetic tape as data accompanying a video or audio signal recorded thereon.

As seen in FIG. 4, each pack includes 5 bytes including an "item" byte designated PC0 and 4 data bytes designated PC1 through PC4.

The item byte PC0 indicates the contents of the remaining data in the pack and is divided into four upper bits and four lower bits referred to, respectively, as a "major item" and a "minor item". A major item may be used, for example, to designate the use of the data contained in words PC1 through PC4, while the accompanying minor item may be used to indicate the specific contents of the following data.

With reference also to FIG. 5, major items can assume one of sixteen states of which states 0000 through 0111 and 1111 are presently defined as follows: control (0000), title (0001), chapter (0010), part (0011), program (0100), line (0101), video auxiliary data (0110), audio auxiliary data (0111), and soft (programmable) mode (1111).

The major item "control" encompasses minor items including tape ID (0000), tape length (0001), timer record specification date (0010), timer record start and end time (0011), text control (1000), and text (1001). In addition, under the control major item, reproduction control instructions may be designated by minor items (1010) and (1011). The reproduction control instructions employ positional information regarding audio and/or video signals recorded on the tape of the corresponding cassette.

With reference also to FIGS. 6 and 7, pack structures for the control major item (0000) and minor items (1010) and (1011), respectively, in accordance with a first embodiment of the present invention are illustrated therein. The pack structure of FIG. 6 contains time code information obtained when a user operates the keyboard 300 for indicating a location on a tape. FIG. 7 illustrates a different pack structure used for storing a tag (an instruction, for example, entered by a user by means of the keyboard 300) which references a track number included in the pack. A tag ID can indicate, for example, an index (starting address of desired data on the tape) or a photo marker (address of an image to be output for printing). Tag control (CONT) specifies an operation to be carried out in accordance with the instruction, such as repeated reproduction or a skip (skipping to a specified address on the tape). While the minor item (1011) designates a pack including track number or address information, the minor item (1010) indicates a pack which does not include such a track number or address.

In addition, pack structures may be provided which include a tag name which can then be displayed on a screen (for example, the display 304) along with a corresponding time code, as shown in FIG. 8. Such a display permits a user, for example, to promptly select a desired edit position on a tape.

Figure 9:
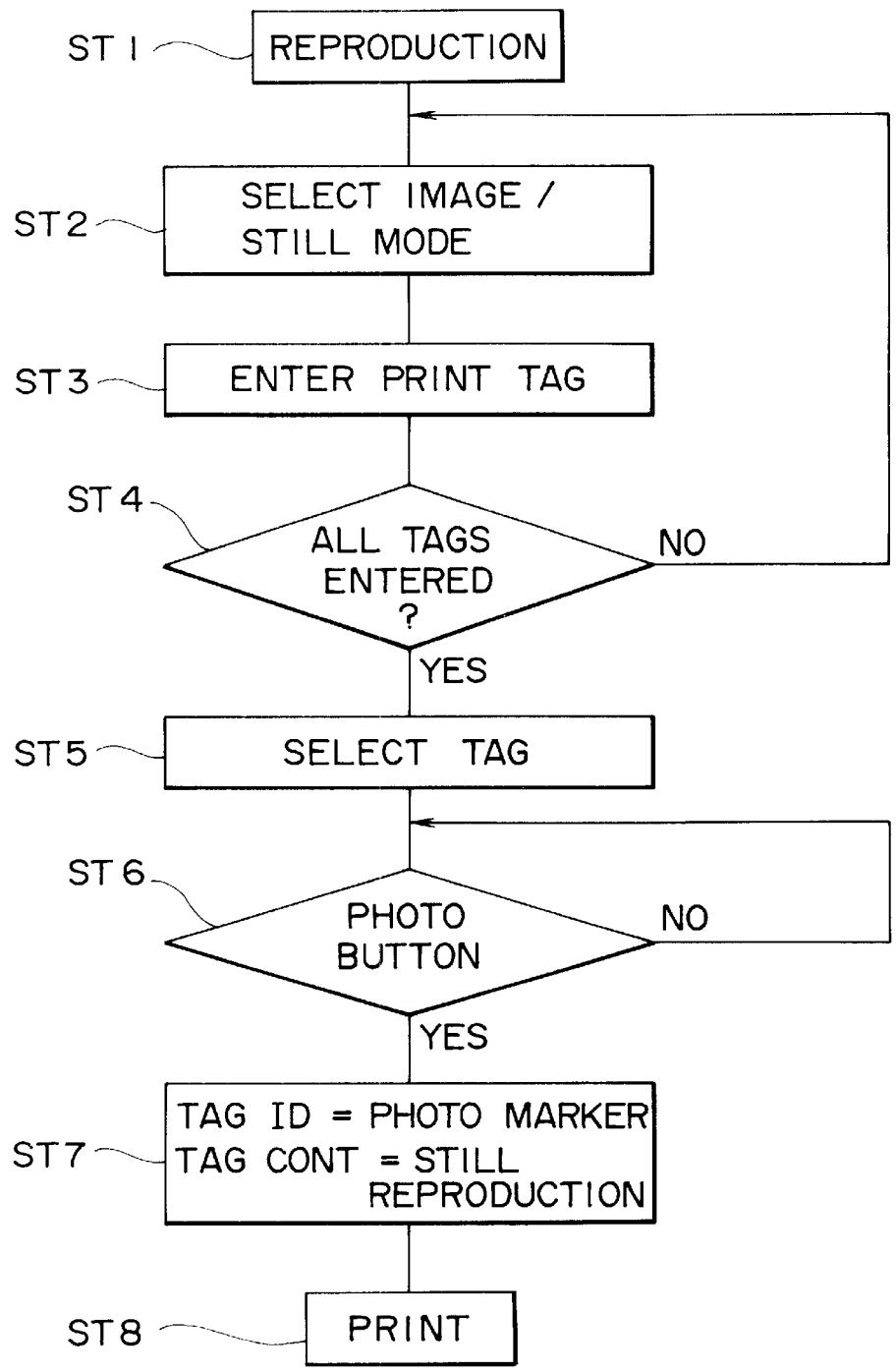
FIG. 9 is a flow chart for use in illustrating a print image process carried out with the use of an embodiment of the present invention.

With reference now to FIG. 9, an image print operation carried out by means of a tape cassette incorporating a memory unit storing reproduction control instructions in accordance with an embodiment of the present invention, is illustrated therein. Initially, a user loads a tape cassette in accordance with an embodiment of the present invention in the recording/reproducing apparatus of FIGS. 1–3 and enters a reproduction mode with the use of the keyboard 300, as indicated by step ST1. Thereafter, the user selects a particular screen or image to be printed by entering a still picture mode signal by means of the keyboard 300, as indicated in step ST2. Once this has been accomplished, the user enters a tag by means of the keyboard 300 which conveys the instruction that the selected image be output for printing, as indicated by step ST3.

When the print tag is entered, it is stored as a reproduction control instruction by the microcomputer 302 and therefrom to the memory unit of the tape cassette. As indicated by step ST4, the user may choose to enter multiple tags and, once all have been entered, indicates this fact by an appropriate entry using the keyboard 300. Each time a tag is entered in the step ST3, the corresponding time code or track address information is stored by the microcomputer 302 in a pack including the reproduction control instruction for printing the image. The entered tags are likewise provided for storage in the memory unit of the tape cassette via the MIC terminal 220 of FIG. 2A.

Once the tags have all been entered, the user selects one by means of the keyboard 300 based on the displayed tag names (ST6) and presses a photo button of the keyboard 300 (step ST6), whereupon a photo marker is entered in the tag ID of the corresponding pack and a still-picture reproduction instruction is written in the tag control portion of thereof as stored in the memory unit of the tape cassette. Then, by selecting the tag, the image on the tape represented thereby can be printed as indicated by step ST8.

Accordingly, once an appropriate pack has been entered in the memory unit of the tape cassette to indicate a print operation for a designated image, the tape cassette may be ejected from the recording/reproducing apparatus and subsequently loaded in a further apparatus to reproduce the designated image by selecting the tag name which is then displayed on a screen thereof, such as that illustrated in FIG. 8.

Further reproduction operations may be controlled by means of tags stored by the memory unit of the tape cassette. For example, an instruction may be stored therein for commanding a reproducing apparatus to begin reproduction from a corresponding location as indicated by a time code or track address of a corresponding pack. Further operations may thus be controlled, such as reproduction of multiple recorded segments or skipping one or more signals recorded on the tape.

Figure 10:
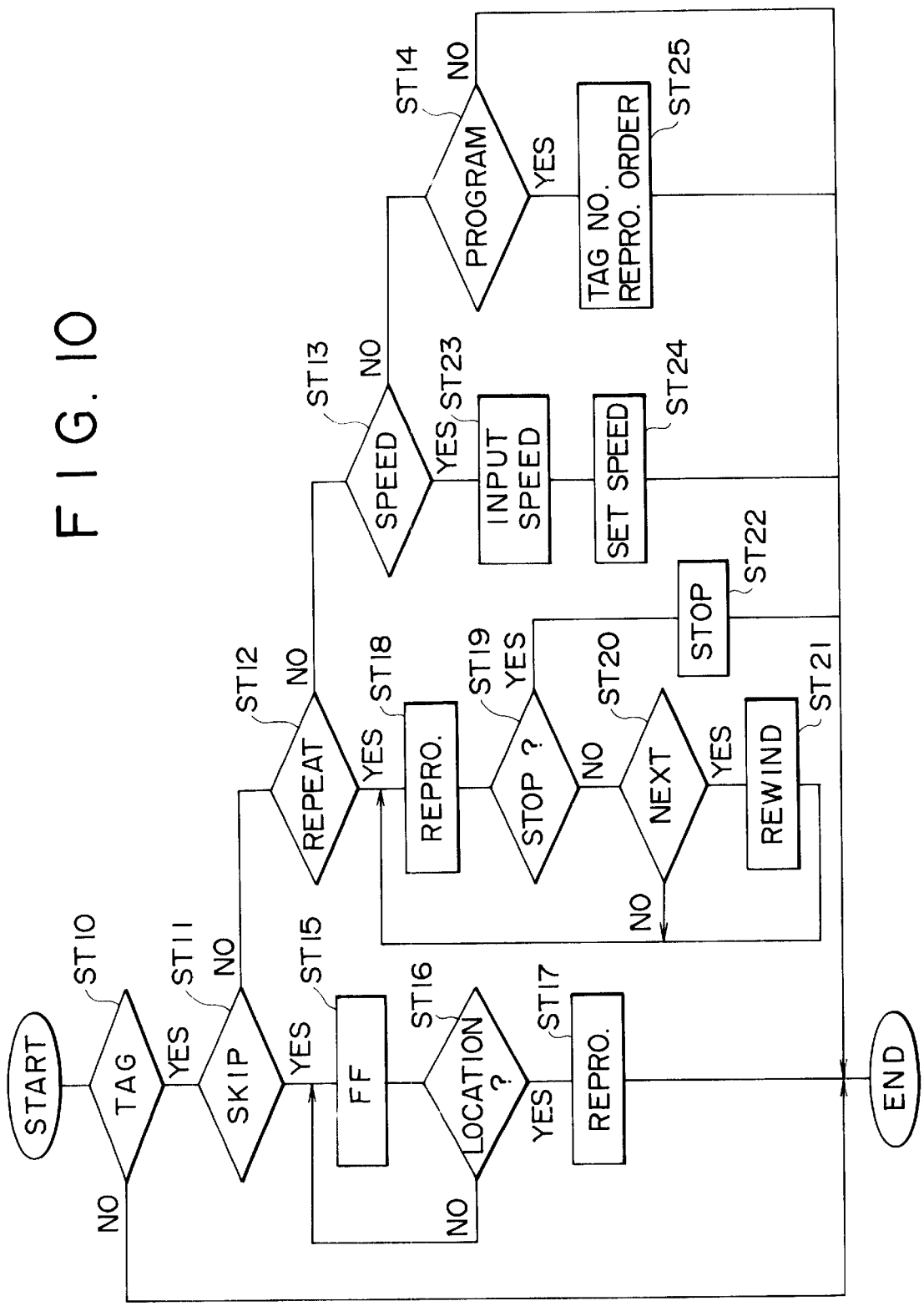
FIG. 10 is a flow chart illustrating operations which may be controlled by means of an embodiment of the present invention.

Referring to FIG. 10, further reproduction processes carried out under the control of reproduction control information stored in a memory unit of a tape cassette in accordance with another embodiment of the present invention are illustrated thereby. In a step ST10, a reproduction apparatus in which the tape cassette is loaded reads the contents of the memory unit thereof to determine whether they represent reproduction control instructions. If so, in a following step ST11, the reproduction apparatus determines whether the minor item is equal to (1011) and, if so, whether (1) skip reproduction is to be carried out (ST11), or repeated reproduction is to be carried out (ST12), or (3) reproduction speed control is to be effected (ST13), or (4) program reproduction is to be carried out (ST14). Each of these operations is discussed separately hereinbelow, although the separate operations may be combined as may be useful.

In skip reproduction (step ST11), the reproducing apparatus is fast forwarded (FF) as indicated by step ST15 until a predetermined tape location is accessed (ST16). Thereupon, normal speed reproduction is carried out (ST17). In the foregoing manner, a desired recorded segment may be accessed quickly.

In repeated reproduction (step ST12), reproduction is carried out from a "current" position to detection of a "next" position on the tape. That is, in step ST18 normal reproduction is initiated and, unless a stop key of the keyboard 300 has been actuated (step ST19), reproduction continues until the "next" location or tag is detected (ST20) whereupon the tape is rewound to the "current" location or tag. If, however, actuation of the stop key is detected, reproduction is stopped (ST22) at that point.

In the reproduction speed control operation (ST13), a reproduction speed is read from the reproduction control instruction stored in the memory unit of the tape cassette (ST23) and the reproduction apparatus carries out reproduction at the indicated speed (step ST24). Accordingly, a predetermined audio and/or video signal can be selected from among those recorded on the tape and reproduced at a desired speed, such as a slow or high speed.

In program reproduction (ST14) data is reproduced in a predetermined order indicated by a "tag number" of the reproduction control instruction (step ST25). In this mode of operation, audio and/or video signals may be selectively extracted from the tape at random positions (skipping or rewinding as necessary to access such locations) to reproduce the extracted signals as if they were recorded continuously.

In a further embodiment of a tape cassette having a memory unit storing reproduction control instructions, operations such as voice/picture quality control, editing control and viewing/listening environment control are carried out based on such reproduction control instructions.

Figure 11:
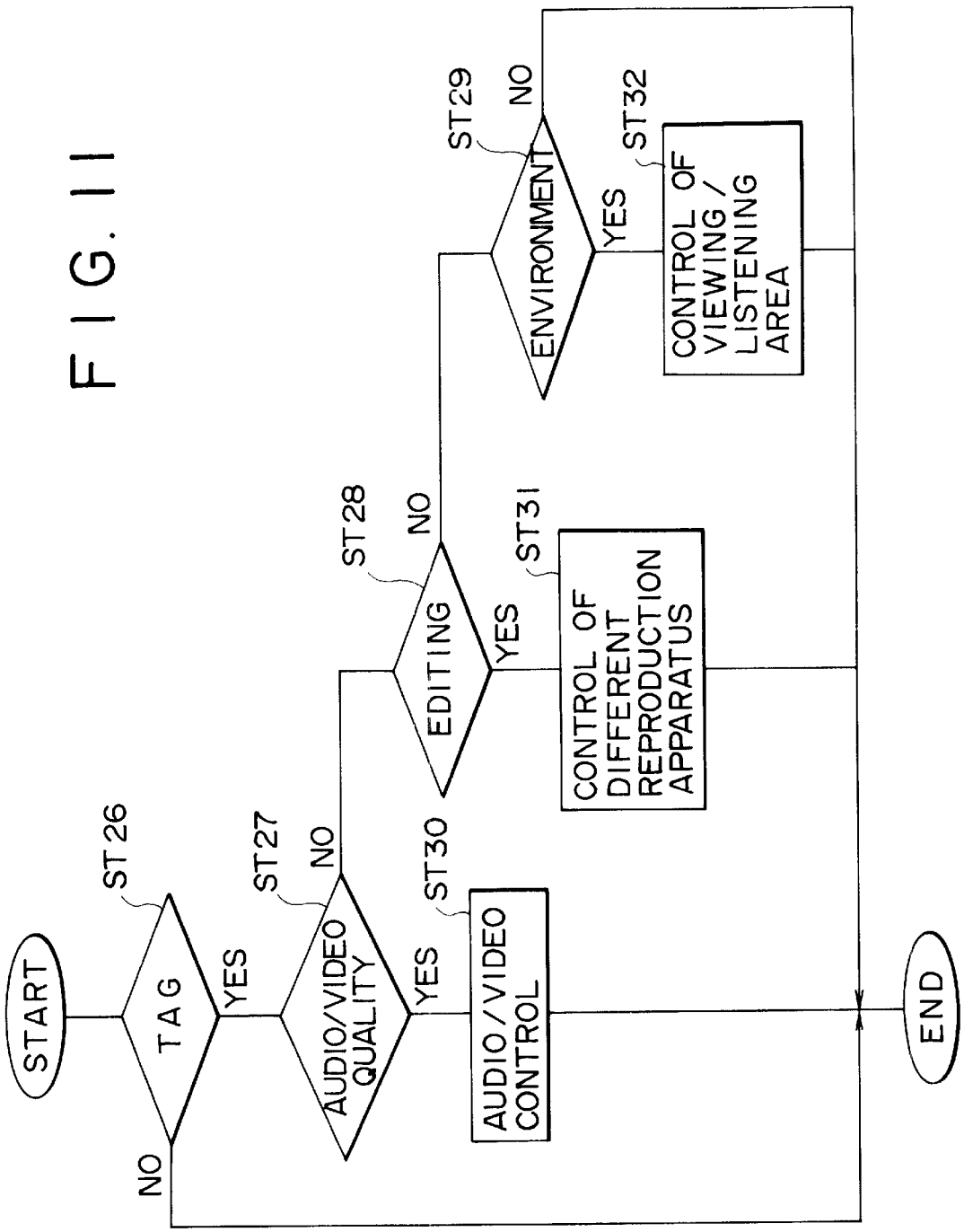
FIG. 11 is a flow chart of further operations which may be controlled by means of an embodiment of the present invention.

As shown in FIG. 11, in a step ST26 the contents of the memory unit of the tape cassette are analyzed to determine whether they contain reproduction control instructions (major item=0000, and minor items=1010 or 1011), and whether voice/picture quality control, editing control or environment control are indicated thereby. It should be noted that the foregoing operations may be carried out separately or may be combined with one another and/or with any or all of the control operations discussed above in connection with FIG. 10.

In voice/picture quality control (step ST27), control can be asserted over audio characteristics, such as volume, as well as picture characteristics, such as blurring, based on an instruction stored in a tag pack (ST30).

In editing control (ST28), reproduction control instructions in the "tag control" portion of a pack can be carried out on an apparatus other than the apparatus in which the tape cassette is loaded, for example, stop and reproduction instructions. Accordingly, control of such other apparatus may be exercised to extract a desired segment while dubbing or carrying out other editing operations, which render such operations less complex for the user.

In environment control (step ST29), control of the viewing or listening environment is carried out as a part of reproduction control. For example, a lighting apparatus operatively associated with the reproduction apparatus may be controlled according to the content of the reproduced audio and/or video signals. Similarly, control of speaker apparatus within the area may be exercised to enhance a sense of presence. These operations may be controlled based on the content of the "tag control" of an appropriate tag pack (step ST32).

In a further embodiment of a tape cassette having a memory unit for storing reproduction control instructions, a tag pack and a zone end pack structure are provided for storing data in such memory unit. The tag pack stores positional information defining a zone start point together with an instruction regarding the operational mode to adopt at the zone start. The zone end pack stores positional information for the zone end point and provides a further operational instruction. That is, when storing instructions for a zone on the tape into the memory unit, both a tag pack (header=0Bh) and a zone end pack (header=0Fh) are included as a pair.

Referring now to FIG. 12A, the tag pack structure includes a minor item (1011) of byte PC0, followed by four additional bytes PC1 through PC4. In this particular data structure, PC1 represents the lowermost 7 bits of an absolute track number (indicating a corresponding fixed position on a tape), PC2 represents an intermediate 8 bits of the absolute track number and PC3 represents the uppermost 8 bits thereof, so that the absolute track number includes a total of 23 bits.

The lower 4 bits of PC4 constitute a tag ID, while the upper 4 bits form a text flag. The tag ID is paired with a zone end pack if the particular 4 bits of the tag ID indicate that a zone is specified, otherwise, the tag ID instead specifies a particular point on the tape. That is, if the lower 4 bits are (0000)=index, (0001)=skip start, (0010) PP (Photo Picture), (0101)=still, or (0110)=freeze, only one point on the tape is specified, so that no zone end pack is paired with the tag pack. However, if the lower 4 bits of PC4 are (0011)= program play start or (0100)=zone play, thus indicating the starting point of a zone, the tag pack is then paired with a zone end pack. The foregoing reproduction instructions will be described in greater detail hereinbelow.

FIG. 13A illustrates the structure of the zone end pack having a minor item=0Fh. Bytes PC1, PC2 and PC3 specify an absolute track number constituting a zone end point. Byte PC4 is an 8-bit tag control (TAG CONT) providing a reproduction control instruction between two points on a tape represented by respective positional data.

Combinations of the upper four bits of the tag control implement a variety of functions. With reference also to FIG. 13B, (1) if the uppermost 2 bits are (01), reproduction is performed only once in response to the zone end pack; (b) if the upper 2 bits are (10), reproduction is carried out twice; and (3) if the uppermost 2 bits are (11), reproduction is repeated until a specific entry is made to halt this operation. The 3 bits following the 2 uppermost bits of the tag control byte specify a forward mode instruction, while the lowermost three bits specify a reverse mode instruction. The various forward mode instructions are specified in FIG. 13C. For example, (100) in the three forward mode bits of the tag control byte specify a fast forward operation, while if the corresponding bits are instead (101) a "strobe" instruction is specified (that is, to alternately display and blank an image). The reverse mode (RMODE) instructions are specified in FIG. 13D. For example, if the 3 lowermost bits of the tag control byte are (001), reverse reproduction is specified, while if the same three bits are instead (010), reverse slow reproduction is specified. Additional reverse mode instructions include (011) which specifies a rewind reproduction or "review" mode, while if the same three bits are instead (101) a reverse strobe (that is, to alternately display and blank the screen during reverse reproduction) is specified.

The following examples illustrate the manner in which the tag pack and the zone end pack described above provide reproduction control instructions. The tag pack stores the zone start point as the absolute track address in bytes PC1, PC2 and PC3. The zone end pack stores an absolute address in bytes PC1, PC2 and PC3 which specifies the zone end position.

Referring to the flow chart of FIGS. 14A and 14B, operations which are carried out either (1) when a tag pack is paired with a zone end pack, or (2) when only a tag pack is provided are illustrated. In a step ST33, after a tape cassette has been loaded in a reproducing apparatus, its memory unit is checked to determine whether a tag pack is stored therein. If a tag pack is found, then the memory is checked for the presence of a corresponding zone end pack in a step ST34. If such a zone end pack is found, it is next determined whether a program reproduction instruction is conveyed by the tag ID (ST35). Such instructions include program play start (0011), in which a program reproduction mode is commanded, and zone play (0100), wherein reproduction is carried out according to a command based both on the absolute track number of the tag pack and that of the zone end pack (ST37). If, on the other hand, a program reproduction instruction is not included in the tag pack (ST 35), further reproduction control operations based both on the contents of the tag pack and the zone end pack are carried out, as will be explained in greater detail below in connection with FIG. 14B.

If in step ST34 a zone end pack is not found which is paired with the tag pack found in step ST33, either an index operation (ST38), a skip start operation (ST40), a picture photo operation (ST42), a still operation (ST44) or a freeze operation (ST46) is carried out. The index operation (tag ID=0000) serves to obtain a starting address of desired data recorded on the tape and then carry out program reproduction (ST39). In a skip start operation (tag ID=0001), the apparatus skips to a position represented by an absolute track number of a following tag pack (ST41). In the picture photo operation (tag ID=0010) an image at a corresponding absolute track address specified by the tag pack is reproduced as a still picture (ST43). In the still operation (tag ID=0101) an image corresponding to an absolute track number stored in the tag pack is reproduced as a still picture for a predetermined period of time (ST45). The freeze operation (tag ID=0110) reproduces a picture specified by an absolute track number in the tag pack in the still picture state for a predetermined period of time while continuing to reproduce the audio signal in a normal fashion (ST47).

As noted above, when, in the step ST35 of FIG. 14A, a program reproduce instruction is not found in the tag pack, processing is carried out as illustrated in FIG. 14B. That is, when both a tag pack and a corresponding zone end pack are found, and the tag ID of the tag pack is not (0011), one of a special reproduction, an edit control and an environment control function is carried out.

In step ST48 it is determined whether a special reproduction function is specified by the tag pack. If so, in step ST49, a reproduction control operation according to a specified command is performed in a zone defined by absolute track numbers of the tag pack and the zone end pack.

If instead an edit control function is specified, this is detected in step ST50. Such edit control operations include temporary suspension of an operation as well as temporary reproduction utilizing a plurality of interconnected recording/reproducing apparatus. That is, such operations can be specified by a user and stored in the memory unit of the tape cassette to perform such operations automatically, thereby enhancing editing efficiency (step ST51).

If an environment control function is specified, this is detected in step ST52 and the specified control is carried out in step ST53. That is, the environment of the viewing/listening area can be controlled by such instructions in synchronization with a reproduced picture/sound signal. Exemplary control functions include control of lighting intensity, turning on/off particular lights, and generation of artificial smells to enhance a sense of presence. Control of environment in this fashion assists in creating a miniature-scale theatrical effect.

It will be appreciated that instructions which can be conveyed by means of the tag pack and the zone end pack are not limited to the above-mentioned control operations. They can be used, for example, for carrying out control operations providing added value information based on information recorded on the tape.

Next, reproduction control between specified positions on a tape as represented by FIGS. 14A and 14B are described in greater detail.

Figure 15A:
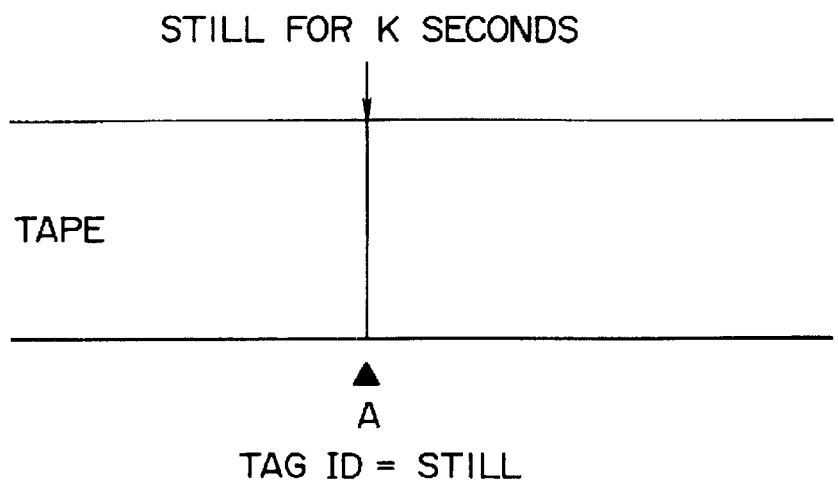
Figure 15B:
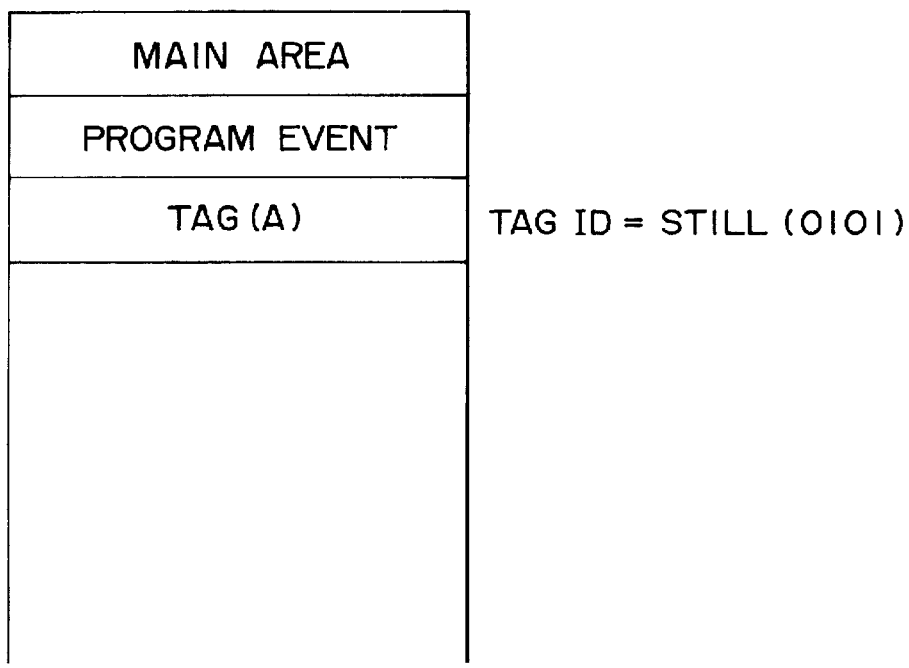

In one embodiment and with reference to FIGS. 15A and 15B, a still reproduction control operation is illustrated therein which is specified by a tag ID of (0101). In carrying out this operation, once the position specified by a track number or address stored in the tag pack has been reached (in FIG. 15A, address A). An image stored at that location is reproduced as a still picture for a predetermined period of time, after which normal reproduction is resumed.

FIG. 15B outlines the contents of the memory unit of the tape cassette. As shown in FIG. 15B, the memory is divided into a main area, a program event area, and a tag area arranged in the order of ascending addresses. The main area stores an application ID which defines a data structure for the memory, together with information about the recording medium, the cassette and the memory itself. The program event area stores positional information for start and end points of a program stored in the memory as well as character data concerning such program. In this example, the tag pack stores the track address of point A on the tape together with a tag ID=(0101) specifying still reproduction.

Figure 16A:
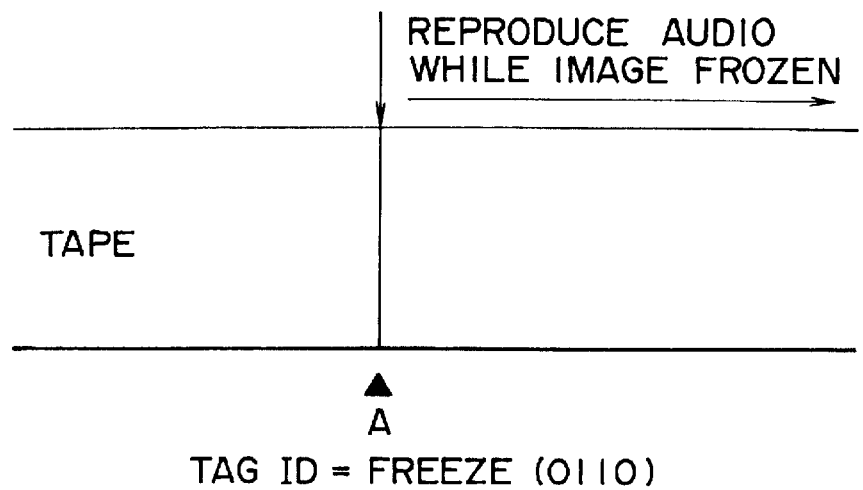

In another embodiment a "freeze" reproduction operation is carried out in the manner illustrated in FIG. 16A. When this function is commanded, a reproduction apparatus transports the tape until a specified point, indicated as point "A" in FIG. 16A, corresponding to an absolute track address included in a tag pack containing a freeze instruction and captures an image recorded on the tape at that point in a memory of the reproduction apparatus. The captured image is output by the reproduction apparatus for a predetermined period of time. As the captured image is output, the reproduction apparatus continues to reproduce recorded audio as the tape is transported. Upon expiration of the predetermined period of time, normal video reproduction is resumed.

Figure 16B:
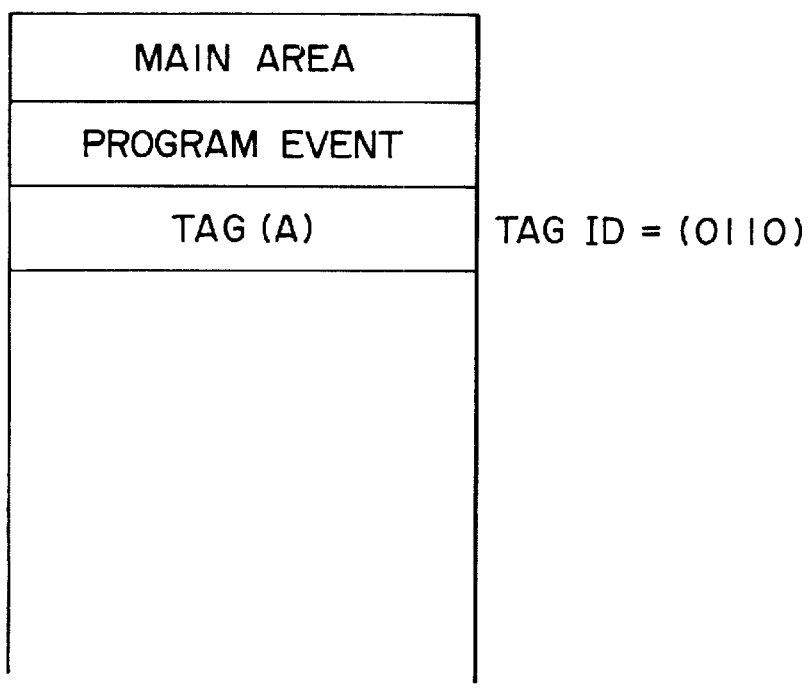

With reference also to FIG. 16B, the contents of the memory unit of the tape cassette are divided into a main area, a program event area, and a tag area in the order of ascending addresses, in the same manner as described hereinabove in connection with FIG. 15B. In the case of FIG. 16B, the tag pack indicated therein stores a tag ID=(0110) which commands the freeze operation to be carried out for an image stored at the point A identified by an absolute track address included in the tag pack.

Figure 17A:
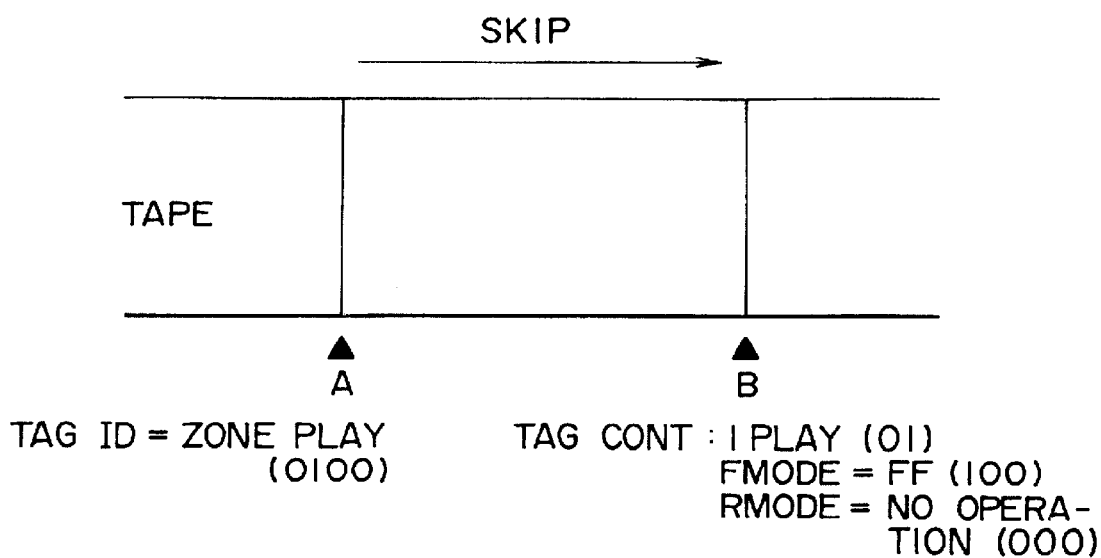
Figure 17B:
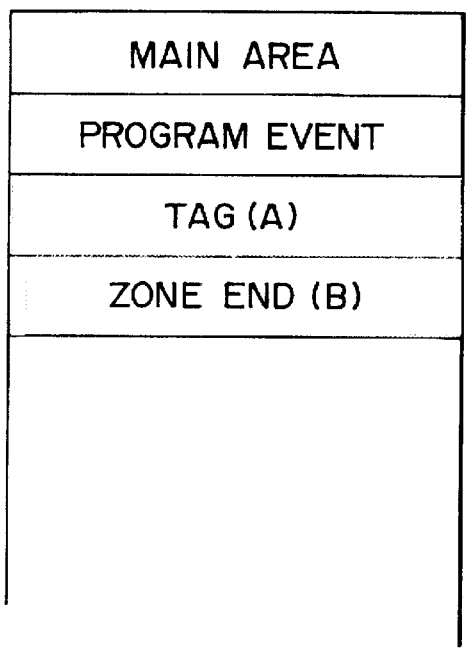

Referring now to FIG. 17A, a "skip reproduction" is illustrated therein. With reference also to 17B, the contents of the memory unit include a tag pack having an absolute track address representing a point A along a tape illustrated schematically in FIG. 17A. As indicated in FIG. 17B, a zone end pack is also included in the memory unit and including an absolute track address representing a point B along the tape of FIG. 17A. The tag pack also includes a tag ID=(0100) which specifies a "zone play" operation. The zone end pack includes a tag control (PC4) of (01), indicating that a single reproduction operation is to be carried out. The tag pack and zone end pack of FIG. 17B instruct the reproduction apparatus to transport the tape from point A to point B without reproducing the signals therebetween, that is, to "skip" these signals. If the zone end pack includes a forward mode=(100), the tape is transported by fast forward from point A to point B, while if the zone end pack includes a forward mode=(011), the tape is transported from point A to point B in a cue mode. The zone end pack stores a reverse mode of (000) indicating no reverse operation. The skip reproduction operation is useful for deleting an unwanted segment, such as a commercial.

Figure 18A:
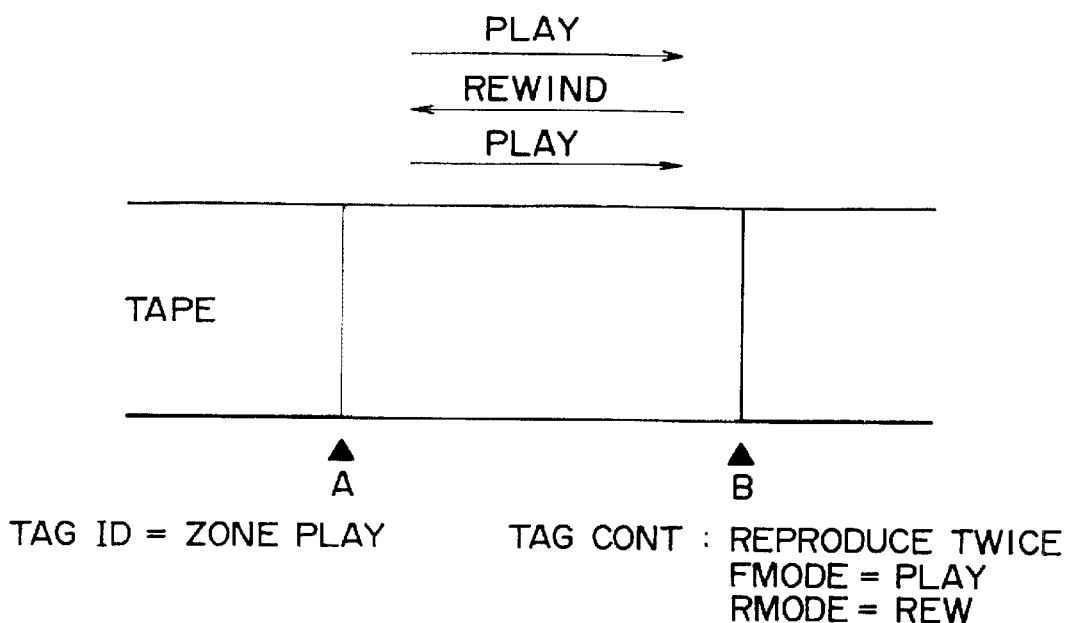
Figure 18B:
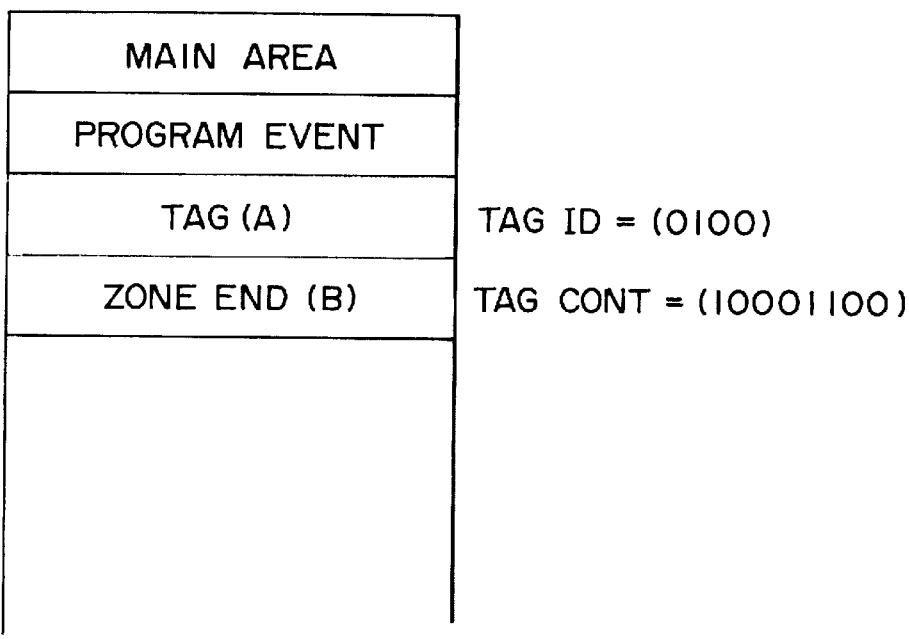

Referring to FIG. 18A, a further zone operation is illustrated thereby wherein a tape is reproduced from a point A to a point B thereof, rewound from point B to point A and reproduced again to point A to point B. With reference also to FIG. 18B, the contents of the memory unit of the tape cassette include a tag pack specifying the absolute address of the point A and a zone end pack specifying the address of the point B on the tape. The tag pack includes a zone play (0100) tag ID indicating a zone start point, while the zone end pack includes a tag control of (10) indicating that reproduction is to be carried out twice. Consequently, the tag control of the zone end pack also includes a forward mode of (001) indicating "play" and a reverse mode of (100) for "rewind".

Figure 19A:
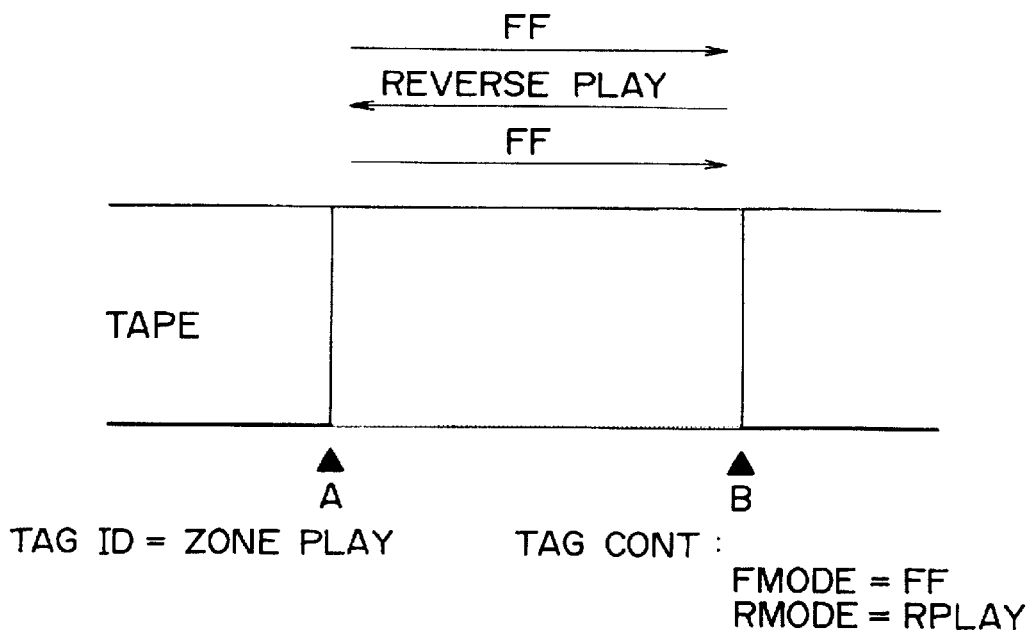
Figure 19B:
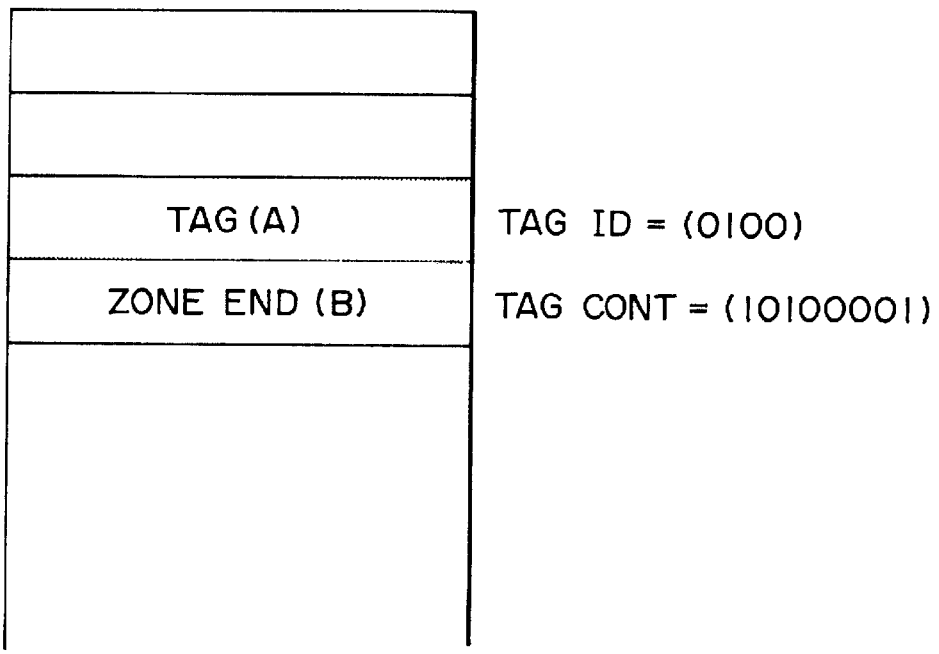
Figures 20A, 20B:
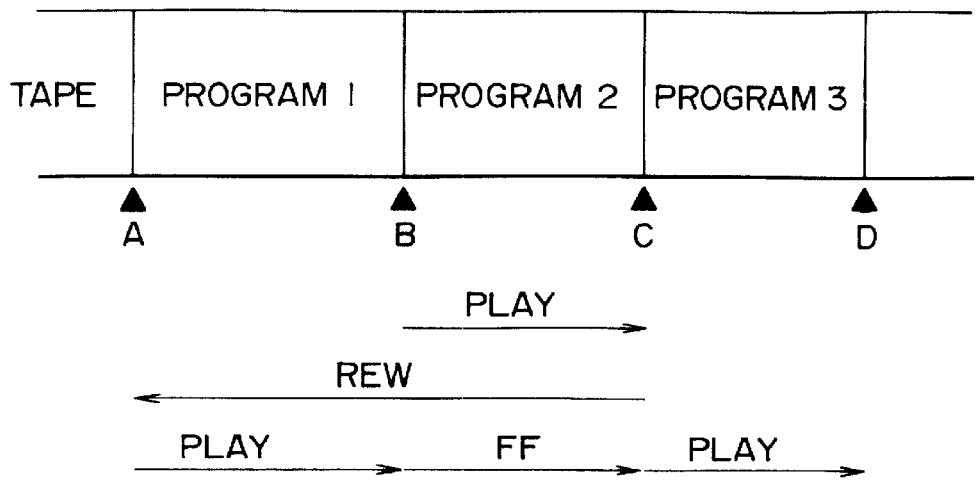

FIG. 19A illustrates a "reverse reproduction" operation which is carried out between a point A on a tape to a point B thereon. More specifically, the tape is transported from the point A to the point B in a fast forward mode, and from point B the tape is transported in a reverse direction as its contents from point B to point A are reproduced, and once the tape returns to the point A, it is again transported in the fast forward mode to the point B. FIG. 19B illustrates the contents of the memory unit of the tape cassette for carrying out the reverse reproduction mode. As shown in FIG. 19B, a tag pack includes the absolute address of the point A together with a tag ID specifying zone play (0100). A zone end pack includes the absolute address of the point B, as well as a tag control of (10) together with a forward mode of (100) indicating fast forward and a reverse mode of (001) indicating reverse play. A "program reproduction" operation is illustrated by FIG. 20A. In this particular example, the "program reproduction" operation is carried out to reproduce multiple programs in a selectable order. As shown in FIG. 20A, programs 1, 2 and 3 are recorded in that order on the tape, but are reproduced in the order of program 2, followed by program 1 and finally program 3. In this case, one tag pack and five zone end packs provide the program reproduction control instructions for carrying out this sequence of operations. The tag pack includes a program play start tag ID (0011) together with the absolute address of the point B on the tape, indicating a program start point. A first zone end pack, as shown in FIG. 20B, includes the absolute address at a point C on the tape together with a tag control of (01), a forward mode of (001) and reverse mode of (000). Consequently, the tape is reproduced from point B to point C initially, so that program 2 is the first reproduced in this operation.

A second zone end pack includes an absolute address of the point A on the tape as well as a tag control of (01), with a forward mode of (000) and a reverse mode (100). In response, the reproducing apparatus transports the tape from point C to point A in the rewind mode. The third zone end pack includes an absolute address of the track number at point B and a tag control (01) together with a forward mode of (001) and a reverse mode of (000). Consequently, in response to this tag pack, the reproduction apparatus reproduces the tape from point A to point B.

A fourth zone end pack includes an absolute address of the point C on the tape and a tag control of (01), together with a forward mode of (100) and a reverse mode of (000). In response, the reproducing apparatus fast forwards the tape from point B to point C. The last zone end pack includes the absolute address of the point D on the tape and a tag control of (01), together with a forward mode of (001) and a reverse mode of (000). Consequently, the tape is reproduced from point C to point D, whereupon the exemplary program reproduction operation is completed. From the foregoing it will be apparent that regardless of the order in which programs are recorded on the tape, they may be reproduced in any desired order as if they had been edited for this purpose.

A zone end pack followed by another zone end pack in the memory requires only one absolute track address for specifying a single point on the tape. In addition, each tag pack need only relate to a first one of a plurality of zone end packs. In this manner, the memory area of the memory unit is utilized effectively.

FIGS. 21A and 21B provide a further example of a programmable play mode. In this case, as indicated in FIG. 21A, programs 1, 2, 3 and 4 are recorded on a tape in that order and reproduced in the same order by in selectably different modes.

In this example, one tag pack and four end packs provide the program reproduction control instructions. The tag pack includes a tag ID for program play start (0011) and an absolute track address of point A on the tape indicating a program start point. The first zone end pack includes an absolute track address for tape point B and a tag control of (10), together with forward mode of (001) and a reverse mode of (000). Consequently, the tape is played from point A to point B.

The second zone end pack includes an absolute track address of the point C and a tag control of (01), together with a forward mode of (010) and a reverse mode of (000). In response, the reproducing apparatus reproduces program 2 at a slow speed. The third zone end pack includes an absolute track address of tape point D and a tag control of (01), together with a forward mode of (100) and a reverse mode of (000). Consequently, the tape is fast forwarded from the point C to the point D. The fourth zone end pack includes an absolute track address of tape point E and a tag control of (01), together with a forward mode of (001) and a reverse mode of (000). In response, the reproducing apparatus carries out normal reproduction of program 4 which is recorded between tape points D and E. It will be seen that the foregoing operations are carried out as if the tape had previously been edited.

As with the forgoing embodiment, each zone end pack followed by another zone end pack need only specify one absolute track address. Moreover, the tag pack need relate only to the first of the zone end packs in a following group. Consequently, limited memory area is utilized effectively.

Figures 22A, 22B:
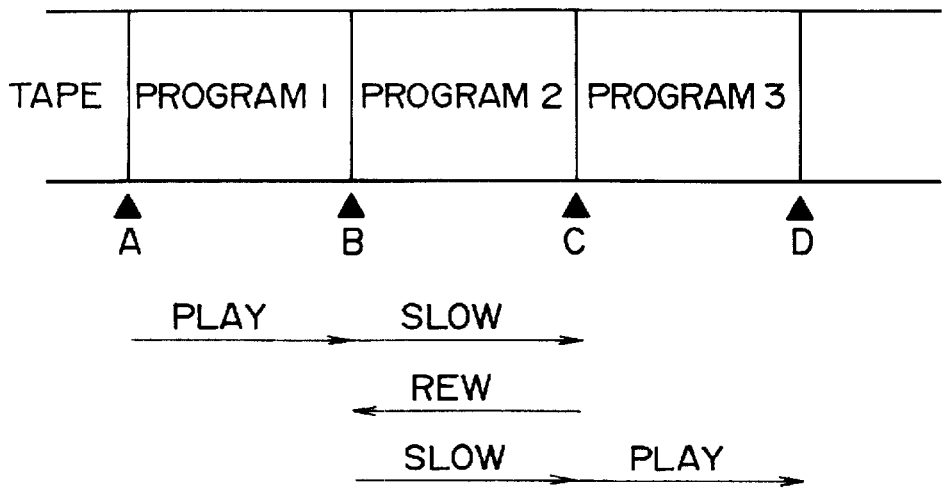

A further example of a programmable play mode will now be explained in connection with FIGS. 22A and 22B. In this case, programs 1, 2 and 3 recorded on a tape in that order are reproduced using selectably different modes of operation, namely, program 1 is first reproduced in a play mode, followed by two successive reproductions of program 2 in a slow play mode, followed by a single reproduction of program 3 in a normal play mode. One tag pack and three zone end packs, as shown in FIG. 22B, provide the program reproduction control instructions. The tag pack includes a absolute track address of tape point A at the beginning of program 1, together with a play start (0011) tag ID indicating a program start point.

A first zone end pack includes an absolute track address of a tape point B at the end of program 1 and the beginning of program 2, together with a tag control of (01), a forward mode of (001) and the reverse mode of (000). Consequently, program 1 is reproduced in the normal play mode form point A to point B. The second zone end pack includes an absolute track address of the point C at the end of program 2 and the beginning of program 3 and a tag control of (10), that is, "play twice, reproduce twice", together with a forward mode of (010) and a reverse mode of (100). In response, the reproduction apparatus first reproduces program 2 in the slow mode from point B to point C, rewinds from point C to point B and then reproduces again in the slow mode from point B to point C.

The third and final zone end pack includes an absolute track address at point D (the end of program 3) and a tag control of (01), together with a forward mode of (001) and a reverse mode of (000). As a result, the reproduction apparatus reproduces program 3 in the normal play mode from point C to point D.

As in the foregoing embodiments, each zone end pack followed by another zone end pack specifies only one zone end point, while the tag pack relates only to the first of the zone end packs, so that limited memory area is effectively utilized.

Figure 23A:
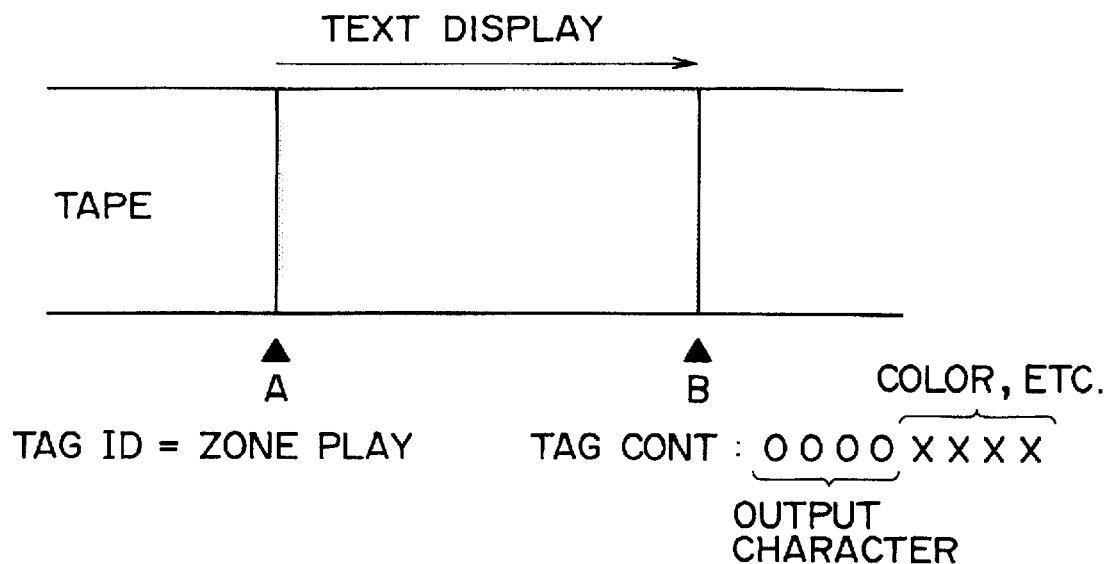
Figure 23B:
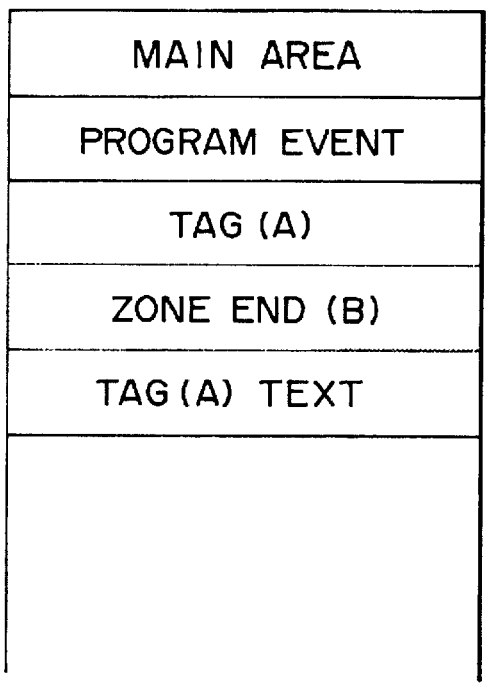

FIG. 23A illustrates a character display operation which occurs during reproduction within a specified zone from tape point A to tag point B. With reference also to FIG. 23B, in addition to a tag pack and a zone end pack, the memory unit of the tape cassette stores a text pack with stores the characters to be displayed from the point A as specified in the tag pack. The tag pack includes the absolute track address of the point A together with a zone play tag ID. The zone end pack includes a tag control having the four upper bits (0000) indicating control of character output. The four lower bits of the tag control specify features such as the color of the characters and the manner in which they are displayed, such as a blinking display. As a result, the specified characters are displayed during reproduction from the point A to the point B in order to provide a synthetic screen with embedded characters without the need to edit the data reported on the tape.

Thus far, a variety of special reproducing operations implemented under the control of a tag pack and a zone end pack have been described. In addition to these operations, these packs can be employed to control operations such as disabling recording within a zone and controlling reproduction of signals recorded after timer recording. These additional control operations will now be described.

Figure 24A:
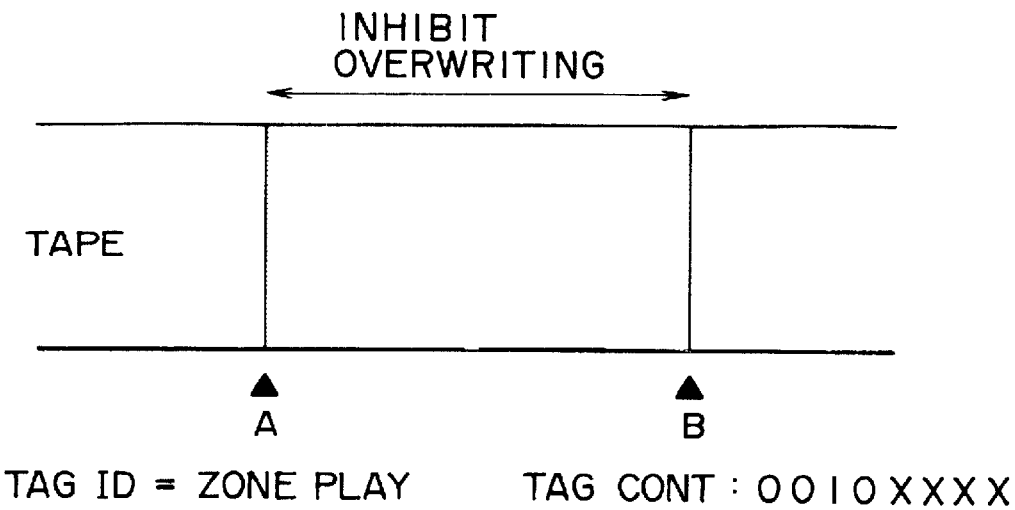
Figure 24B:
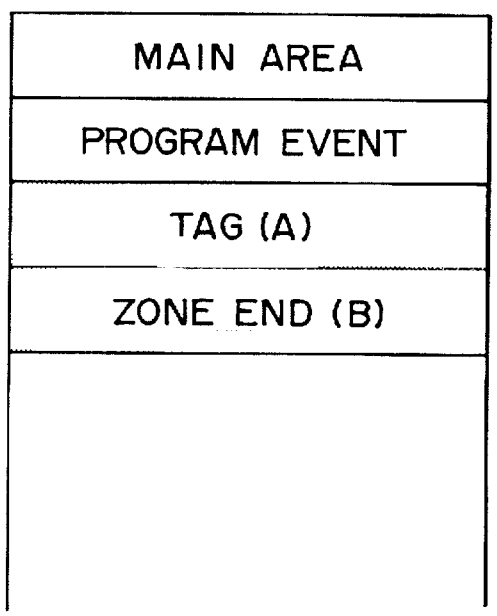

With reference to FIG. 24A, overwriting protection is provided in a zone extending from a tape point A to a tape point B by means of the tag and zone end packs stored in the memory unit as illustrated in FIG. 24B. The tag pack includes an absolute track address for the point A and a zone play tag ID indicating a zone start. The zone end pack includes an absolute track address at point B and values (0001) for the upper four bits of the tag control (indicating recording-proof). In response, the reproduction apparatus inhibits recording between the points A and B on the tape.

Figure 25A:
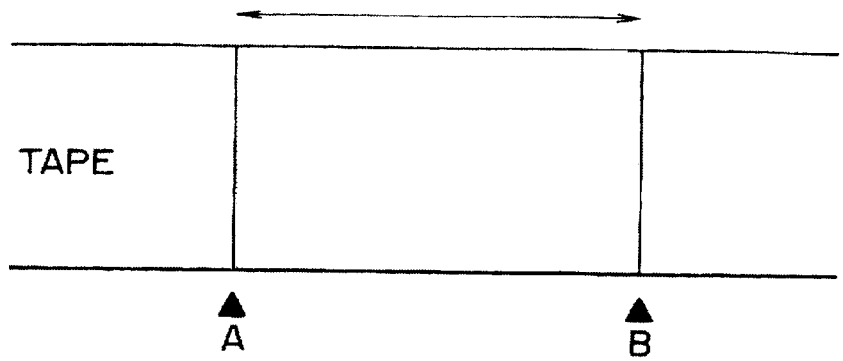
Figure 25B:
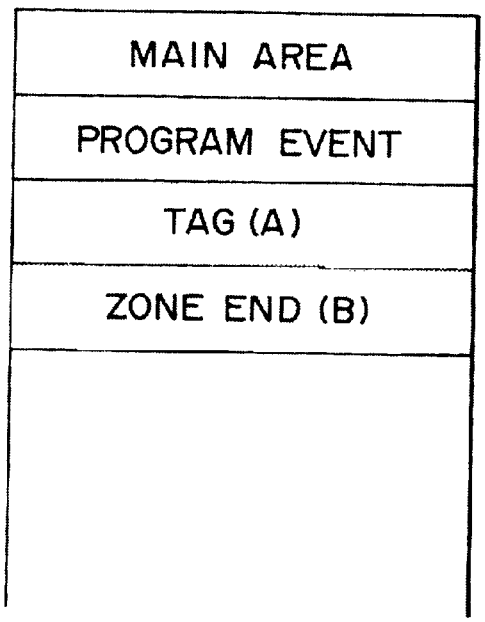

FIG. 25A indicates an operation for providing an indication that a program recorded between tape points A and B has been reproduced at least once previously. To carry out this display, a tag pack and a zone end pack are recorded in the memory unit as indicated in FIG. 25B, wherein the tag pack includes an absolute track address for the point A and a zone play tag ID indicating a zone start. The zone end pack includes the absolute address of the point B and a value (0010) for the upper four bits of the tag control which indicate the program within the zone has been played already. Consequently, it can easily be determined that the zone between points A and B on the tape has been reproduced one or more times after recording, which provides a convenient means for determining which of various programs recorded in a timer mode for later viewing have already been seen. Once the specified zone has been rewritten (after having been reproduced previously), the "already-played" indication becomes invalid.

From the foregoing it will appreciated that the memory cassette in accordance with the present invention provides a memory unit storing reproduction control instructions utilizing positional information of audio/video signals recorded on a tape of the tape cassette, so that a variety of control operations may be carried without the need to add to or modify the audio/video signals.

In various embodiments, a desired image can be printed easily and promptly without modifying the recorded audio/video signals; the reproducing apparatus may skip recorded signals to selectively reproduce other audio/video signals recorded on the tape without modification to any such signals; reproduction speed control instructions may be stored in the memory unit to selectably adjust reproduction speeds for the various audio/video signals recorded on the tape; audio/video control information may also be stored for selectively modifying audio and video signals as reproduced without modifying those signals as recorded; printing information may be displayed on a screen for selection of a desired image for printing; repetitive reproduction control instructions are stored to control selective repeated reproduction of audio/video signals recorded on the tape; program reproduction instructions are stored to enable prioritized reproduction of audio/video signals recorded on the tape in any desired order without modification thereof; editing control instructions are stored in the memory unit for exercising control over a recording/reproducing apparatus other than one in which the tape cassette has been loaded, thereby facilitating editing operations such as dubbing; environmental control information is stored in the memory unit so that environmental conditions such as lighting, speaker volume and sound quality may be modified in synchronism with reproduction of the audio/video signals from the tape, thereby enhancing sense of presence; and the reproduction control instructions are pack-structured so that the instructions are arranged in the same data structure as tape information and other positional information stored in the memory unit, so that effective utilization thereof may be achieved to afford increased memory capability.

Although specific embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A tape reproduction system comprising:

a tape reproduction device; and a tape cassette including a tape recording medium for storing audio and/or video data, and a memory unit having reproduction control instructions, wherein said tape reproduction device uses said reproduction control instructions of said tape cassette to perform a programmed reproduction.

2. The tape reproduction system of claim 1, wherein said reproduction control information includes print information control instructions used to reproduce an image selected from a plurality of images stored on the tape recording medium so as to produce a print of said image.

3. The tape reproduction system of claim 1, wherein said reproduction control information includes skip information control instructions used to control said tape reproduction device to reproduce only selected audio and/or video data selected from all of the audio and/or video data recorded on the tape recording medium.

4. The tape reproduction system of claim 1, wherein said reproduction control information includes speed information control instructions used to vary the speed at which said tape reproduction device reproduces audio and/or video data from said tape recording medium.

5. The tape reproduction system of claim 1, wherein said reproduction control information includes repeat information control instructions used to control said tape reproduction device to repeatedly reproduce selected audio and/or video data from said tape recording medium.

6. The tape reproduction system of claim 1, wherein said reproduction control information includes program information control instructions used to prioritize positional information corresponding to said audio and/or video data and thereby prioritize the order in which said tape reproduction device reproduces the audio and/or video data from said tape recording medium.

* * * * *